United States Patent
Du et al.

(10) Patent No.: US 10,034,212 B2
(45) Date of Patent: Jul. 24, 2018

(54) WIRELESS COMMUNICATION METHOD, APPARATUS AND SYSTEM

(71) Applicant: Huawei Technologies Co., Ltd., Shenzhen (CN)

(72) Inventors: Jianwei Du, Shenzhen (CN); Weimin Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 176 days.

(21) Appl. No.: 14/742,198

(22) Filed: Jun. 17, 2015

(65) Prior Publication Data

US 2015/0289187 A1  Oct. 8, 2015

Related U.S. Application Data

(63) Continuation of application No. PCT/CN2013/083358, filed on Sep. 12, 2013.

(30) Foreign Application Priority Data

Dec. 18, 2012 (CN) ............ 2012 1 0551467

(51) Int. Cl.
*H04W 36/22* (2009.01)
*H04W 4/02* (2018.01)
(Continued)

(52) U.S. Cl.
CPC ........... *H04W 36/22* (2013.01); *H04L 5/0091* (2013.01); *H04W 4/02* (2013.01);
(Continued)

(58) Field of Classification Search
CPC . H04W 28/0284; H04W 28/20; H04W 48/06; H04W 28/02; H04W 4/18;
(Continued)

(56) References Cited

U.S. PATENT DOCUMENTS

2010/0128677 A1* 5/2010 Liu .................. H04W 36/0022
370/328
2011/0310740 A1* 12/2011 Ju ........................ H04W 28/08
370/235
(Continued)

FOREIGN PATENT DOCUMENTS

| CN | 102647771 A | 8/2012 |
|---|---|---|
| CN | 102740366 A | 10/2012 |
| WO | WO 2012149954 A1 | 11/2012 |

OTHER PUBLICATIONS

"WLAN selection based on load information," 3GPP TSG SA WG2 Meeting #94, New Orleans, Louisiana, TD S2-124266, 3$^{rd}$ Generation Partnership Project, Valbonne, France (Nov. 12-16, 2012).
(Continued)

*Primary Examiner* — Kwasi Karikari
(74) *Attorney, Agent, or Firm* — Leydig, Voit & Mayer, Ltd.

(57) ABSTRACT

A wireless communication method, apparatus and system are provided. A processing center determines coverages of at least two access end devices; determines a location of a user equipment, which accesses a target service via a first access end device in the at least two access end devices; determines that the user equipment is capable of accessing the target service via a second access end device according to the location of the user equipment and a coverage of the second access end device; and sends indication information used for indicating that the user equipment accesses the target service via the second access end device to the user equipment.

34 Claims, 8 Drawing Sheets

(51) Int. Cl.
  *H04L 5/00* (2006.01)
  *H04W 72/04* (2009.01)
  *H04W 84/12* (2009.01)
  *H04W 88/06* (2009.01)

(52) U.S. Cl.
  CPC ....... *H04W 72/0486* (2013.01); *H04W 84/12* (2013.01); *H04W 88/06* (2013.01)

(58) Field of Classification Search
  CPC ..... H04W 8/20; H04W 4/20; H04W 72/0453; H04W 8/02; H04W 36/22; H04W 40/02; H04W 48/18; H04W 28/08; H04W 36/0011; H04W 36/30; H04W 76/02
  See application file for complete search history.

(56) References Cited

U.S. PATENT DOCUMENTS

2012/0020260 A1  1/2012  Chen et al.
2015/0023341 A1  1/2015  Zhao et al.

OTHER PUBLICATIONS

"Location Information during Network Discovery," 3GPP TSG CT WG1 Meeting #54, Zagreb, Croatia, C1-082439, 3$^{rd}$ Generation Partnership Project, Valbonne, France (Jun. 23-27, 2008).

"Interface/Network Selection based on UE detected Network Information," SA WG2 Meeting #86, Naantali, Finland, S2-113264, 3$^{rd}$ Generation Partnership Project, Valbonne, France (Jul. 11-15, 2011).

"Clarificationon PLMN change triggered by ANDSF," 3GPP TSG-SA WG2 Meeting #71, Budapest, Hungary, S2-091498, XP050333813, 3rd Generation Partnership Project, Valbonne, France (Feb. 16-20, 2009).

* cited by examiner

100 determining, by a processing center in a communication system, coverages of at least two access end devices included in the communication system  S110 determining a location of a user equipment, which accesses a target service via a first access end device in the at least two access end devices, in the communication system 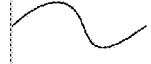 S120 determining that the user equipment is capable of accessing a first target service via a second access end device according to the location of the user equipment in the communication system and a coverage of the second access end device in the at least two access end devices, wherein a communication technology of the first access end device is different from a communication technology of the second access end device, or a carrier frequency used by the first access end device is different from a carrier frequency used by the second access end device  S130 sending first indication information used for indicating that the user equipment accesses the first target service via the second access end device to the user equipment  S140

FIG. 1

200 receiving, by a user equipment in a communication system, first indication information used for indicating that the user equipment accesses a first target service via a second access end device and sent by a processing center, wherein the user equipment accesses a target service via a first access end device in the at least two access end devices, the first indication information is sent by the processing center when the processing center determines that the user equipment is capable of accessing the first target service via the second access end device in the at least two access end devices according to coverages of the at least two access end devices and a location of the user equipment, communication technologies of the at least two access end devices are different, or carrier frequencies used by the at least two access end devices are different — S210 accessing the first target service via the second access end device according to the first indication information — S220

FIG. 5

300 sending, by a third access end device in a communication system, tenth indication information to a processing center, wherein the tenth indication information is used for indicating a current communication state of the third access end device, for enabling the processing center to control access of a user equipment to a target service according to a location of the user equipment in the communication system, a coverage of the third access end device or a fourth access end device in the communication system and the tenth indication information, wherein communication technologies of the third access end device and the fourth access end device are different, or carrier frequencies used by the third access end device and the fourth access end device are different — S310

FIG. 6

400 sending, by a gateway device in a communication system, eleventh indication information to a processing center, wherein the eleventh indication information is used for indicating a current communication state of a port of the gateway device, for enabling the processing center to determine that user equipment is capable of accessing a first target service via a second access end device by means of the gateway device, according to a location of the user equipment, which accesses a target service via a first access end device in at least two access end devices included in the communication system, in the communication system, a coverage of the second access end device in the at least two access end devices, a port capacity of the gateway device and the eleventh indication information, wherein the second access end device accesses to an internet via the gateway device, communication technologies of the at least two access end devices are different, or carrier frequencies used by the at least two access end devices are different ⟶ S410

FIG. 7

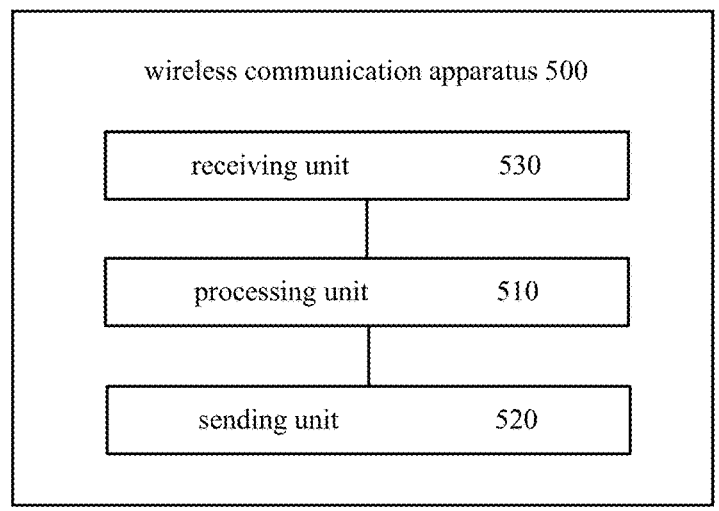

FIG. 8

WIRELESS COMMUNICATION METHOD, APPARATUS AND SYSTEM

CROSS-REFERENCE TO RELATED APPLICATIONS

This application is a continuation of International Patent Application No. PCT/CN2013/083358, filed on Sep. 12, 2013, which claims priority to Chinese Patent Application No. 201210551467.6, filed on Dec. 18, 2012, both of which are hereby incorporated by reference in their entireties.

TECHNICAL FIELD

The present disclosure relates to a field of communications, and in particular, to a wireless communication method, apparatus and system.

BACKGROUND

With a growth of mobile internet services, a data size in a wireless communication network surges to accelerate a demand for bandwidth. In order to alleviate a congestion of a mobile cellular network, network operators need to deploy more base stations to increase a network capacity, but this is bound to increase an investment cost and maintenance cost. To solve this conflict, more and more network operators choose a mobile data offloading mode to offload a part of data in the mobile network to a wireless local area network (WLAN).

At present, a solution of performing offloading on a universal mobile telecommunication system (UMTS) or a long term evolution (LTE) network via the wireless local area network (WLAN) has been supported in some standards, wherein service data are divided into two, one is sent to a user equipment via an original path, namely, UMTS/LTE, and the other is sent to the user equipment via WLAN.

However, only the UMTS+WLAN or LTE+WLAN offloading mode may be achieved in the prior art, so the offloading effect is limited.

SUMMARY

Embodiments of the present disclosure provide a wireless communication method, apparatus and system, which may improve the offloading effect.

In a first aspect, a wireless communication method is provided, including: determining, by a processing center in a communication system, coverages of at least two access end devices comprised in the communication system; determining a location of a user equipment, which accesses a target service via a first access end device in the at least two access end devices, in the communication system; determining that the user equipment is capable of accessing a first target service via a second access end device according to the location of the user equipment in the communication system and a coverage of the second access end device in the at least two access end devices, wherein a communication technology of the first access end device is different from a communication technology of the second access end device, or a carrier frequency used by the first access end device is different from a carrier frequency used by the second access end device; and sending first indication information used for indicating that the user equipment accesses the first target service via the second access end device to the user equipment.

In a possible implementation manner, the method further includes: receiving second indication information sent by the first access end device, wherein the second indication information is used for indicating a current communication state of the first access end device; and the determining that the user equipment is capable of accessing the first target service via the second access end device according to the location of the user equipment in the communication system and the coverage of the second access end device in the at least two access end devices, comprises: determining that the user equipment is capable of accessing the first target service via the second access end device according to the location of the user equipment in the communication system, the coverage of the second access end device in the at least two access end devices and the second indication information.

In combination with the first aspect and the first possible implementation manner, in the second possible implementation manner, the second indication information is used for indicating at least one of the following: a current downlink cache state of the first access end device aiming at the target service, a current resource allocation of the first access end device aiming at the target service, a current load rate of the first access end device and a current signal interference noise ratio of the user equipment.

In combination with the first aspect, the first possible implementation manner and the second possible implementation manner, in the third possible implementation manner, the method further includes: receiving third indication information sent by the user equipment, wherein the third indication information is used for indicating a current communication state of the user equipment; and the determining that the user equipment is capable of accessing the first target service via the second access end device according to the location of the user equipment in the communication system and the coverage of the second access end device in the at least two access end devices, comprises: determining that the user equipment is capable of accessing the first target service via the second access end device according to the location of the user equipment in the communication system, the coverage of the second access end device in the at least two access end devices and the third indication information.

In combination with the first aspect, the first possible implementation manner, the second possible implementation manner and the third possible implementation manner, in the fourth possible implementation manner, the third indication information is used for indicating at least one of the following: a current uplink cache state of the user equipment aiming at the target service, a current reference signal receiving power of the user equipment, a current signal interference noise ratio of the user equipment, a current channel quality of the user equipment, a communication technology the user equipment is capable of supporting and a current remaining battery of the user equipment.

In combination with the first aspect, the first possible implementation manner, the second possible implementation manner, the third possible implementation manner and the fourth possible implementation manner, in the fifth possible implementation manner, the method further includes: receiving fourth indication information sent by the second access end device, wherein the fourth indication information is used for indicating a current communication state of the second access end device; and the determining that the user equipment is capable of accessing the first target service via the second access end device according to the location of the user equipment in the communication system and the coverage of the second access end device in the at least two access end devices, comprises: determining that the user equipment is capable of accessing the first target service via the second access end device according to the location of the user equipment in the communication system, the coverage of the second access end device in the at least two access end devices and the fourth indication information.

In combination with the first aspect, the first possible implementation manner, the second possible implementation manner, the third possible implementation manner, the fourth possible implementation manner and the fifth possible implementation manner, in the sixth possible implementation manner, the fourth indication information is used for indicating at least one of the following: a current resource allocation of the second access end device, and a current load rate of the second access end device.

In combination with the first aspect, the first possible implementation manner, the second possible implementation manner, the third possible implementation manner, the fourth possible implementation manner, the fifth possible implementation manner and the sixth possible implementation manner, in the seventh possible implementation manner, the second access end device is capable of accessing to an internet via any port of at least two ports of a first gateway device, and the method further comprises: determining communication capacities of the at least two ports; receiving fifth indication information sent by the first gateway device, wherein the fifth indication information is used for indicating current communication states of the at least two ports; determining a first port from the at least two ports according to the communication capacities of the at least two ports and the fifth indication information; and sending sixth indication information used for indicating the first port to the second access end device, for enabling the second access end device to transmit the first target service via the first port.

In combination with the first aspect, the first possible implementation manner, the second possible implementation manner, the third possible implementation manner, the fourth possible implementation manner, the fifth possible implementation manner, the sixth possible implementation manner and the seventh possible implementation manner, in the eighth possible implementation manner, the fifth indication information is used for indicating at least one of the following: current link states of the at least two ports, and current load rates of the at least two ports.

In combination with the first aspect, the first possible implementation manner, the second possible implementation manner, the third possible implementation manner, the fourth possible implementation manner, the fifth possible implementation manner, the sixth possible implementation manner, the seventh possible implementation manner and the eighth possible implementation manner, in the ninth possible implementation manner, the second access end device is capable of accessing to an internet via any gateway device of at least two second gateway devices, and the method further comprises: determining communication capacities of ports of the at least two second gateway devices; receiving seventh indication information sent by the at least two second gateway devices, wherein the seventh indication information is used for indicating current communication states of the ports of the at least two second gateway devices; determining a target second gateway device from the at least two second gateway devices according to the communication capacities of the ports of the at least two second gateway devices and the seventh indication information; and sending eighth indication information used for indicating the target second gateway device to the second access end device, for enabling the second access end device to transmit the first target service via the target second gateway device.

In combination with the first aspect, the first possible implementation manner, the second possible implementation manner, the third possible implementation manner, the fourth possible implementation manner, the fifth possible implementation manner, the sixth possible implementation manner, the seventh possible implementation manner, the eighth possible implementation manner and the ninth possible implementation manner, in the tenth possible implementation manner, the seventh indication information is used for indicating at least one of the following: a current link state of the port of the second gateway device, and a current load rate of the port of the second gateway device.

In a second aspect, a wireless communication method is provided, including: receiving, by a user equipment in a communication system, first indication information used for indicating that the user equipment accesses a first target service via a second access end device and sent by a processing center, wherein the user equipment accesses a target service via a first access end device in at least two access end devices, the first indication information is sent by the processing center when the processing center determines that the user equipment is capable of accessing the first target service via the second access end device in the at least two access end devices according to coverages of the at least two access end devices and a location of the user equipment, communication technologies of the at least two access end devices are different, or carrier frequencies used by the at least two access end devices are different; and accessing the first target service via the second access end device according to the first indication information.

In a possible implementation manner, the method further includes: sending ninth indication information to the processing center, wherein the ninth indication information is used for indicating the location of the user equipment in the communication system, for enabling the processing center to determine the location of the user equipment in the communication system according to the ninth indication information.

In combination with the second aspect and the first possible implementation manner, in the second possible implementation manner, the method further includes: sending third indication information to the processing center, wherein the third indication information is used for indicating a current communication state of the user equipment, for enabling the processing center to determine that the user equipment is capable of accessing the first target service via the second access end device according to the coverages of the at least two access end devices, the location of the user equipment and the third indication information.

In combination with the second aspect, the first possible implementation manner and the second possible implementation manner, in the third possible implementation manner, the third indication information is used for indicating at least one of the following: a current uplink cache state of the user equipment aiming at the target service, a current reference signal receiving power of the user equipment, a current signal interference noise ratio of the user equipment, a current channel quality of the user equipment, a communication technology the user equipment is capable of supporting and a current remaining battery of the user equipment.

In a third aspect, a wireless communication method is provided, including: sending, by a third access end device in a communication system, tenth indication information to a processing center, wherein the tenth indication information is used for indicating a current communication state of the third access end device, for enabling the processing center to control access of a user equipment to a target service according to a location of the user equipment in the communication system, a coverage of the third access end device or a fourth access end device in the communication system and the tenth indication information, wherein communication technologies of the third access end device and the fourth access end device are different, or carrier frequencies used by the third access end device and the fourth access end device are different.

In a possible implementation manner, if the user equipment accesses the target service via the third access end device, the tenth indication information is used for indicating at least one of the following: a current downlink cache state of the third access end device aiming at the target service, a current resource allocation of the third access end device aiming at the target service, a current load rate of the third access end device and a current signal interference noise ratio of the user equipment; if the user equipment accesses the target service via the third access end device, the tenth indication information is used for indicating a current load rate of the third access end device.

In combination with the third aspect and the first possible implementation manner, in the second possible implementation manner, the user equipment accesses the target service via the fourth access end device, the third access end device accesses to an internet via at least two ports of a first gateway device, and the method further comprises: receiving sixth indication information used for indicating a first port and sent by the processing center, wherein the first port is determined by the processing center according to communication capacities of the at least two ports and current communication states of the ports of the first gateway device; and transmitting the first target service via the first port according to the sixth indication information.

In combination with the third aspect, the first possible implementation manner and the second possible implementation manner, in the third possible implementation manner, the user equipment accesses the target service via the fourth access end device, the third access end device is capable of accessing to an internet via any gateway device of at least two second gateway devices, and the method further comprises: receiving eighth indication information used for indicating a target second gateway device and sent by the processing center, wherein the target second gateway device is determined by the processing center according to communication capacities of ports of the at least two second gateway devices and current communication states of the ports of the at least two second gateway devices; and transmitting the first target service via the target second gateway device according to the eighth indication information.

In combination with the third aspect, the first possible implementation manner, the second possible implementation manner and the third possible implementation manner, in the fourth possible implementation manner, the current communication state of the port includes at least one of the following: a current link state of the port, and a current load rate of the port.

In a fourth aspect, a wireless communication method is provided, including: sending, by a gateway device in a communication system, eleventh indication information to a processing center, wherein the eleventh indication information is used for indicating a current communication state of a port of the gateway device, for enabling the processing center to determine that a user equipment is capable of accessing a first target service via a second access end device by means of the gateway device, according to a location of the user equipment, which accesses a target service via a first access end device in at least two access end devices comprised in the communication system, in the communication system, a coverage of the second access end device in the at least two access end devices, a port capacity of the gateway device and the eleventh indication information, wherein the second access end device accesses to an internet via the gateway device, communication technologies of the at least two access end devices are different, or carrier frequencies used by the at least two access end devices are different.

In a possible implementation manner, the eleventh indication information is used for indicating at least one of the following: a current link state of the port of the gateway device, and a current load rate of the port of the gateway device.

In a fifth aspect, a wireless communication apparatus is provided, including: a processing unit, configured to enable a processing center in a communication system to determine coverages of at least two access end devices comprised in the communication system; determine a location of a user equipment, which accesses a target service via a first access end device in the at least two access end devices, in the communication system; determine that the user equipment is capable of accessing a first target service via a second access end device according to the location of the user equipment in the communication system and a coverage of the second access end device in the at least two access end devices, wherein a communication technology of the first access end device is different from a communication technology of the second access end device, or a carrier frequency used by the first access end device is different from a carrier frequency used by the second access end device; and a sending unit, configured to send first indication information used for indicating that the user equipment accesses the first target service via the second access end device to the user equipment.

In a possible implementation manner, the apparatus further includes: a receiving unit, configured to receive second indication information sent by the first access end device, wherein the second indication information is used for indicating a current communication state of the first access end device; and the processing unit is specifically configured to determine that the user equipment is capable of accessing the first target service via the second access end device according to the location of the user equipment in the communication system, the coverage of the second access end device in the at least two access end devices and the second indication information.

In combination with the fifth aspect and the first possible implementation manner, in the second possible implementation manner, the second indication information is used for indicating at least one of the following: a current downlink cache state of the first access end device aiming at the target service, a current resource allocation of the first access end device aiming at the target service, a current load rate of the first access end device and a current signal interference noise ratio of the user equipment.

In combination with the fifth aspect, the first possible implementation manner and the second possible implementation manner, in the third possible implementation manner, the apparatus further includes: a receiving unit, configured to receive third indication information sent by the user equipment, wherein the third indication information is used for indicating a current communication state of the user equipment; and the processing unit is specifically configured to determine that the user equipment is capable of accessing the first target service via the second access end device according to the location of the user equipment in the communication system, the coverage of the second access end device in the at least two access end devices and the third indication information.

In combination with the fifth aspect, the first possible implementation manner, the second possible implementation manner and the third possible implementation manner, in the fourth possible implementation manner, the third indication information is used for indicating at least one of the following: a current uplink cache state of the user equipment aiming at the target service, a current reference signal receiving power of the user equipment, a current signal interference noise ratio of the user equipment, a current channel quality of the user equipment, a communication technology the user equipment is capable of supporting and a current remaining battery of the user equipment.

In combination with the fifth aspect, the first possible implementation manner, the second possible implementation manner, the third possible implementation manner and the fourth possible implementation manner, in the fifth possible implementation manner, the apparatus further includes: a receiving unit, configured to receive fourth indication information sent by the second access end device, wherein the fourth indication information is used for indicating a current communication state of the second access end device; and the processing unit is specifically configured to determine that the user equipment is capable of accessing the first target service via the second access end device according to the location of the user equipment in the communication system, the coverage of the second access end device in the at least two access end devices and the fourth indication information.

In combination with the fifth aspect, the first possible implementation manner, the second possible implementation manner, the third possible implementation manner, the fourth possible implementation manner and the fifth possible implementation manner, in the sixth possible implementation manner, the fourth indication information is used for indicating at least one of the following: a current resource allocation of the second access end device, and a current load rate of the second access end device.

In combination with the fifth aspect, the first possible implementation manner, the second possible implementation manner, the third possible implementation manner, the fourth possible implementation manner, the fifth possible implementation manner and the sixth possible implementation manner, in the seventh possible implementation manner, the second access end device is capable of accessing to an internet via any port of at least two ports of a first gateway device, and the processing unit is further configured to determine communication capacities of the at least two ports; the apparatus further comprises: a receiving unit, configured to receive fifth indication information sent by the first gateway device, wherein the fifth indication information is used for indicating current communication states of the at least two ports; the processing unit is further configured to determine a first port from the at least two ports according to the communication capacities of the at least two ports and the fifth indication information; and the sending unit is further configured to send sixth indication information used for indicating the first port to the second access end device, for enabling the second access end device to transmit the first target service via the first port.

In combination with the fifth aspect, the first possible implementation manner, the second possible implementation manner, the third possible implementation manner, the fourth possible implementation manner, the fifth possible implementation manner, the sixth possible implementation manner and the seventh possible implementation manner, in the eighth possible implementation manner, the fifth indication information is used for indicating at least one of the following: current link states of the at least two ports, and current load rates of the at least two ports.

In combination with the fifth aspect, the first possible implementation manner, the second possible implementation manner, the third possible implementation manner, the fourth possible implementation manner, the fifth possible implementation manner, the sixth possible implementation manner, the seventh possible implementation manner and the eighth possible implementation manner, in the ninth possible implementation manner, the second access end device is capable of accessing to an internet via any gateway device of at least two second gateway devices, and the processing unit is further configured to determine communication capacities of ports of the at least two second gateway devices; the apparatus further comprises: a receiving unit, configured to receive seventh indication information sent by the at least two second gateway devices, wherein the seventh indication information is used for indicating current communication states of the ports of the at least two second gateway devices; the processing unit is further configured to determine a target second gateway device from the at least two second gateway devices according to the communication capacities of the ports of the at least two second gateway devices and the seventh indication information; the sending unit is further configured to send eighth indication information used for indicating the target second gateway device to the second access end device, for enabling the second access end device to transmit the first target service via the target second gateway device.

In combination with the fifth aspect, the first possible implementation manner, the second possible implementation manner, the third possible implementation manner, the fourth possible implementation manner, the fifth possible implementation manner, the sixth possible implementation manner, the seventh possible implementation manner, the eighth possible implementation manner and the ninth possible implementation manner, in the tenth possible implementation manner, the seventh indication information is used for indicating at least one of the following: a current link state of the port of the second gateway device, and a current load rate of the port of the second gateway device.

In a sixth aspect, a wireless communication apparatus is provided, including: a receiving unit, configured to enable a user equipment in a communication system to receive first indication information used for indicating that the user equipment accesses a first target service via a second access end device and sent by a processing center, wherein the user equipment accesses a target service via a first access end device in at least two access end devices, the first indication information is sent by the processing center when the processing center determines that the user equipment is capable of accessing the first target service via the second access end device in the at least two access end devices according to coverages of the at least two access end devices and a location of the user equipment, communication technologies of the at least two access end devices are different, or carrier frequencies used by the at least two access end devices are different; and a processing unit, configured to access the first target service via the second access end device according to the first indication information.

In a possible implementation manner, the apparatus further includes: a sending unit, configured to send ninth indication information to the processing center, wherein the ninth indication information is used for indicating the location of the user equipment in the communication system, for enabling the processing center to determine the location of the user equipment in the communication system according to the ninth indication information.

In combination with the sixth aspect and the first possible implementation manner, in the second possible implementation manner, the apparatus further includes: a sending unit, configured to send third indication information to the processing center, wherein the third indication information is used for indicating a current communication state of the user equipment, for enabling the processing center to determine that the user equipment is capable of accessing the first target service via the second access end device according to the coverages of the at least two access end devices, the location of the user equipment and the third indication information.

In combination with the sixth aspect, the first possible implementation manner and the second possible implementation manner, in the third possible implementation manner, the fourth indication information is used for indicating at least one of the following: a current uplink cache state of the user equipment aiming at the target service, a current reference signal receiving power of the user equipment, a current signal interference noise ratio of the user equipment, a current channel quality of the user equipment, a communication technology the user equipment is capable of supporting and a current remaining battery of the user equipment.

In a seventh aspect, a wireless communication apparatus is provided, including: a sending unit, configured to enable a third access end device in a communication system to send tenth indication information to a processing center, wherein the tenth indication information is used for indicating a current communication state of the third access end device, for enabling the processing center to control access of a user equipment to a target service according to a location of the user equipment in the communication system, a coverage of the third access end device or a fourth access end device in the communication system and the tenth indication information, wherein communication technologies of the third access end device and the fourth access end device are different, or carrier frequencies used by the third access end device and the fourth access end device are different.

In a possible implementation manner, if the user equipment accesses the target service via the third access end device, the tenth indication information is used for indicating at least one of the following: a current downlink cache state of the third access end device aiming at the target service, a current resource allocation of the third access end device aiming at the target service, a current load rate of the third access end device and a current signal interference noise ratio of the user equipment; if the user equipment accesses the target service via the third access end device, the tenth indication information is used for indicating a current load rate of the third access end device.

In combination with the seventh aspect and the first possible implementation manner, in the second possible implementation manner, the user equipment accesses the target service via the fourth access end device, the third access end device accesses to an internet via at least two ports of a first gateway device, and the apparatus further comprises: a receiving unit, configured to receive sixth indication information used for indicating a first port and sent by the processing center, wherein the first port is determined by the processing center according to current communication states of the ports of the first gateway device; and a processing unit, configured to transmit the first target service via the first port according to the sixth indication information.

In combination with the seventh aspect, the first possible implementation manner and the second possible implementation manner, in the third possible implementation manner, the user equipment accesses the target service via the fourth access end device, the third access end device is capable of accessing to an internet via any gateway device of at least two second gateway devices, and the apparatus further comprises: a receiving unit, configured to receive eighth indication information used for indicating a target second gateway device and sent by the processing center, wherein the target second gateway device is determined by the processing center according to current communication states of the ports of the at least two second gateway devices; and a processing unit, configured to transmit the first target service via the target second gateway device according to the eighth indication information.

In combination with the seventh aspect, the first possible implementation manner, the second possible implementation manner and the third possible implementation manner, in the fourth possible implementation manner, the current communication state of the port includes at least one of the following: a current link state of the port, and a current load rate of the port.

In an eighth aspect, a wireless communication apparatus is provided, including: a sending unit, configured to enable a gateway device in a communication system to send eleventh indication information to a processing center, wherein the eleventh indication information is used for indicating a current communication state of a port of the gateway device, for enabling the processing center to determine that a user equipment is capable of accessing a first target service via a second access end device by means of the gateway device, according to a location of the user equipment, which accesses a target service via a first access end device in at least two access end devices comprised in the communication system, in the communication system, a coverage of the second access end device in the at least two access end devices, a port capacity of the gateway device and the eleventh indication information, wherein the second access end device accesses to an internet via the gateway device, communication technologies of the at least two access end devices are different, or carrier frequencies used by the at least two access end devices are different.

In a possible implementation manner, the eleventh indication information is used for indicating at least one of the following: a current link state of the port of the gateway device, and a current load rate of the port of the gateway device.

In a ninth aspect, a wireless communication system is provided, including: at least two access end devices, wherein a user equipment accesses a target service via a first access end device in the at least two access end devices, a communication technology of the first access end device is different from a communication technology of a second access end device, or a carrier frequency used by the first access end device is different from a carrier frequency used by the second access end device; a processing center, configured to determine coverages of the at least two access end devices, determine a location of the user equipment in the communication system, determine that the user equipment is capable of accessing a first target service via the second access end device according to the location of the user equipment in the communication system and a coverage of the second access end device in the at least two access end devices, and send first indication information used for indicating that the user equipment accesses the first target service via the second access end device to the user equipment; and the user equipment, configured to receive the first indication information sent by the processing center, and access the first target service via the second access end device according to the first indication information.

According to the wireless communication method, apparatus and system in the embodiments of the present disclosure, at least two access end devices access to the internet via the same gateway device, the user equipment accesses the target device via the first access end device in the at least two access end devices, if the user equipment is within the coverage of the second access end device, the processing center may determine that the second access end device may serve the user equipment, thus may instruct the user equipment to access the target device via the second access end device to offload the first access end device, since the at least two access end devices access to the internet via the same gateway device, even if the first access end device is of a UMTS technology and the second access end device is of an LTE technology, the first access end device may be offloaded by the second access end device, so that the offloading effect may be improved.

BRIEF DESCRIPTION OF DRAWINGS

To illustrate technical solutions of embodiments of the present disclosure more clearly, a brief introduction on the accompanying drawings, which are needed in the description of the embodiments is given below. Apparently, the accompanying drawings in the description below are merely some of the embodiments of the present disclosure, based on which other drawings may be obtained by those of ordinary skill in the art without any creative effort.

FIG. 1 is a schematic flowchart of a wireless communication method according to an embodiment of the present disclosure.

FIG. 5 is a schematic flowchart of a wireless communication method according to another embodiment of the present disclosure.

FIG. 6 is a schematic flowchart of a wireless communication method according to another embodiment of the present disclosure.

FIG. 7 is a schematic flowchart of a wireless communication method according to another embodiment of the present disclosure.

FIG. 8 is a schematic block diagram of a wireless communication apparatus according to an embodiment of the present disclosure.

DESCRIPTION OF EMBODIMENTS

Figure 2:
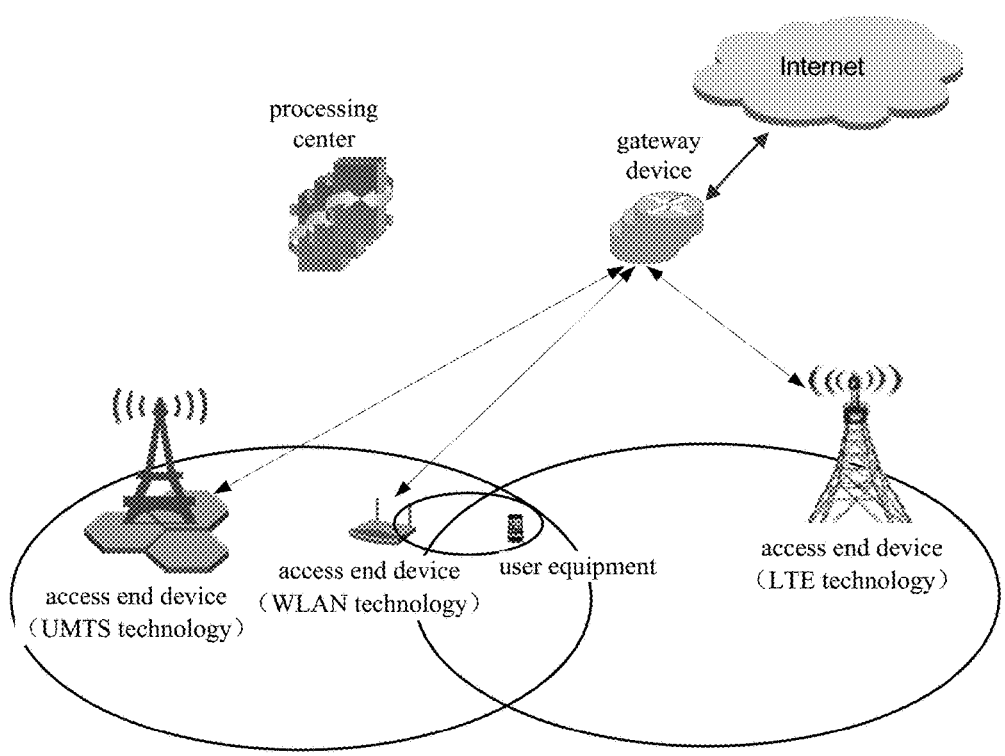
FIG. 2 is a schematic diagram of a structure of a wireless communication system according to an embodiment of the present disclosure.

A clear and complete description of technical solutions of embodiments of the present disclosure will be given below, in combination with the accompanying drawings in the embodiments of the present disclosure. Apparently, the embodiments described below are merely a part, but not all, of the embodiments of the present disclosure. All of the other embodiments, obtained by those of ordinary skill in the art based on the embodiments of the present disclosure without any creative effort, fall into the protection scope of the present disclosure.

The technical solutions of the present disclosure may be applied to various communication systems, for example: a global system of mobile communication (GSM), a code division multiple access (CDMA) system, wideband code division multiple access (WCDMA), general packet radio service (GPRS), long term evolution (LTE) or the like.

In the embodiments of the present disclosure, a user equipment (UE) may also be called a mobile terminal, a mobile user equipment and the like, and may communicate with one or multiple core networks through a radio access network (e.g., RAN, Radio Access Network), the user equipment may be a mobile terminal, for example, a mobile telephone (or called a "cellular" telephone) and a computer having a mobile terminal, for example, may be a portable, pocket, hand-held, computer inbuilt or vehicle-mounted mobile device, and they exchange language and/or data with the radio access network.

In the embodiments of the present disclosure, an access terminal device may be a macro cell base station controller (RNC, Radio Network Controller) or a base station (NodeB), may be a base station (BTS, Base Transceiver Station) or a base station controller in GSM or CDMA, may be a base station (NodeB) or a base station controller in WCDMA or UMTS, may be an evolved base station (eNB or the e-NodeB, evolutional Node B) in LTE, may be a micro cell base station, may be a micro base station (Micro), may be a pico base station (Pico), may be a home base station (also called a femtocell (femto)), and may also be an access point (AP) in WLAN (e.g., Wireless Fidelity WiFi), and this is not limited in the present disclosure.

In the embodiments of the present disclosure, at least two access end devices may be included in a communication system, moreover, carrier frequencies used by the at least two access end devices may be different, or technologies of the at least two access end devices may be different, for example, one access end device is NodeB in UMTS and the other access end device is eNB in LTE, such that a coverage of a first access end device may be overlapped with a coverage of a second access end device, and a user equipment may be simultaneously located within coverages (serving cells) of the at least two access end devices. It should be understood that, the technologies of the access end devices listed above are merely exemplary illustration, and the present disclosure is not limited hereto.

FIG. 1 shows a schematic flowchart of a wireless communication method 100 according to an embodiment of the present disclosure and described from an angle of a processing center, as shown in FIG. 1, the method 100 includes:

S110, determining, by a processing center in a communication system, coverages of at least two access end devices included in the communication system;

S120, determining a location of a user equipment, which accesses a target service via a first access end device in the at least two access end devices, in the communication system;

S130, determining that the user equipment is capable of accessing a first target service via a second access end device according to the location of the user equipment in the communication system and a coverage of the second access end device in the at least two access end devices, wherein a communication technology of the first access end device is different from a communication technology of the second access end device, or a carrier frequency used by the first access end device is different from a carrier frequency used by the second access end device; and S140, sending first indication information used for indicating that the user equipment accesses the first target service via the second access end device to the user equipment.

FIG. 2 is a schematic diagram of a structure of a wireless communication system according to an embodiment of the present disclosure, and arrow directions in the figure are flow directions of service data. As shown in FIG. 2, in the embodiment of the present disclosure, a communication system includes three access end devices (an access end device of a UMTS communication technology, an access end device of an LTE communication technology and an access end device of a WLAN communication technology), and the three access end devices are capable of accessing to an internet via a same gateway device. It should be understood that, the structure of the communication system in the present disclosure listed above is merely exemplary illustration, and the present disclosure is not limited hereto, for example, the communication system includes a random number (at least two) of access end devices, and moreover, the technology of the access end device may also be any technology. It should be noted that, in the embodiment of the present disclosure, one access end device may transmit data via one routing path (the passing-by gateway device and port are fixed) and may also transmit data via a plurality of routing paths (the passing-by gateway device and port are changeable), and this is not particularly limited in the present disclosure, and for convenience of understanding, a condition that one access end device transmits data via one routing path will be firstly illustrated below.

In S110, for example, the processing center may obtain information indicating the coverage of each access end device in the commutation system (e.g., the information may indicate a location and a radiation range of the access end device) from each mobile operator, and may also receive the information indicating the coverage of the access end device in the commutation system (e.g., the information may indicate the location and the radiation range of the access end device) sent periodically or at one time by each access end device, and the processing center may determine the coverage of each access end device in the system in the communication system. It should be understood that, the embodiment of indicating the coverage of the access end device in the communication system via the location and the radiation power of the access end device listed above is merely exemplary illustration, and the present disclosure is not limited hereto.

In S120, the processing center may determine the location of the user equipment.

For example, in the embodiment of the present disclosure, the user equipment has accessed the service (target service) via the first access end device, thus, when having a function of locating the user equipment, the first access end device may send information indicating the location of the user equipment to the processing center, so that the processing center may determine the location of the user equipment according to the information. Moreover, in the embodiment of the present disclosure, a method of the first access end device for locating the user equipment is the same as that in the prior art, thus in order to avoid repetition, the illustration thereof is omitted herein.

In this way, by reporting the location of the user equipment to the processing center via the first access end device, air interface resources may be saved.

As another example, in the embodiment of the present disclosure, when having a function of locating itself, the user equipment may directly send the information indicating the location of the user equipment to the processing center, so that the processing center may determine the location of the user equipment according to the information. Moreover, in the embodiment of the present disclosure, a method of the user equipment for locating itself is the same as that in the prior art, thus in order to avoid repetition, the illustration thereof is omitted herein.

In this way, by reporting the location of the user equipment to the processing center via the user equipment, the instantaneity of the processing center for determining the location of the user equipment may be improved.

As another example, in the embodiment of the present disclosure, the processing center may locate the user equipment according to a signal from the user equipment, in order to determine the location of the user equipment, moreover, in the embodiment of the present disclosure, a method of the processing center for locating the user equipment according to the signal from the user equipment is the same as that in the prior art, thus in order to avoid repetition, the illustration thereof is omitted herein.

As another example, in the embodiment of the present disclosure, the processing center may obtain the information indicating the location of the user equipment from a service provider providing a locating service, so that the processing center may determine the location of the user equipment according to the information.

When the location of the user equipment in the communication system is located within the coverage of the access end device (the second access end device) providing no service to the user equipment, in S130, the processing center may determine that the second access end device may serve the user equipment, or the user equipment is capable of accessing the service (the target service) via the second access end device.

Optionally, in an embodiment of the present disclosure, the method further includes:

receiving second indication information sent by the first access end device, wherein the second indication information is used for indicating a current communication state of the first access end device; and the determining that the user equipment is capable of accessing the first target service via the second access end device according to the location of the user equipment in the communication system and the coverage of the second access end device in the at least two access end devices, includes:

determining that the user equipment is capable of accessing the first target service via the second access end device according to the location of the user equipment in the communication system, the coverage of the second access end device in the at least two access end devices and the second indication information.

Moreover, the second indication information is used for indicating at least one of the following:

a current downlink cache state of the first access end device aiming at the target service, a current resource allocation of the first access end device aiming at the target service, a current load rate of the first access end device and a current signal interference noise ratio of the user equipment.

Specifically, in the embodiment of the present disclosure, the first access end device may report information (an example of the second indication information) indicating the current communication state of the first access end device to the processing center periodically or when a preset trigger event is satisfied. As the above-mentioned trigger event, the following events may be listed:

a downlink cache of the target service is higher than a preset threshold;

a resource allocated to the user equipment is lower than a preset threshold;

a current load rate of the first access end device is higher than a preset threshold;

a current signal interference noise ratio of the user equipment is lower than a preset threshold.

It should be understood that, the trigger events listed above are merely exemplary illustration, and the present disclosure is not limited hereto.

Moreover, as the above-mentioned communication state, the following information may be listed:

a downlink cache of the target service;

a resource allocated to the user equipment;

a current load rate of the first access end device;

a current signal interference noise ratio of the user equipment.

It should be understood that, the information used as the communication state and listed above is merely exemplary illustration, and the present disclosure is not limited hereto.

When the location of the user equipment in the communication system is located within the coverage of the access end device (the second access end device) providing no service to the user equipment, the processing center may judge whether the current communication state of the first access end device satisfies a preset offloading policy or not.

As the above-mentioned preset offloading policy, the following policies may be listed:

a. if access of the user equipment to the target service may be influenced at the current communication state of the first access end device, namely, the user experience is influenced, the target service needs to be offloaded;

b. if continuous access to the target service at the current communication state of the first access end device may influence other user equipment, the target service needs to be offloaded.

It should be understood that, the offloading policies listed above are merely exemplary illustration, and the present disclosure is not limited hereto.

Therefore, under the condition of determining that the target service needs to be offloaded, the processing center may instruct the user equipment to access a part of services (an example of the first target service) or all services (another example of the first target service) via the second access end device.

According to the wireless communication method provided by the embodiment of the present disclosure, since the first access end device reports the current communication state of the first access end device to the processing center, offloading may be performed dynamically and intelligently in real time. The problem of mobile network traffic storm is effectively solved.

Optionally, in an embodiment of the present disclosure, the method further includes:

receiving third indication information sent by the user equipment, wherein the third indication information is used for indicating a current communication state of the user equipment; and the determining that the user equipment is capable of accessing the first target service via the second access end device according to the location of the user equipment in the communication system and the coverage of the second access end device in the at least two access end devices, includes:

determining that the user equipment is capable of accessing the first target service via the second access end device according to the location of the user equipment in the communication system, the coverage of the second access end device in the at least two access end devices and the third indication information.

Moreover, the third indication information is used for indicating at least one of the following:

a current uplink cache state of the user equipment aiming at the target service, a current reference signal receiving power of the user equipment, a current signal interference noise ratio of the user equipment, a current channel quality of the user equipment, a communication technology the user equipment is capable of supporting and a current remaining battery of the user equipment.

Specifically, in the embodiment of the present disclosure, the user equipment may report information (an example of the third indication information) indicating the current communication state of the user equipment to the processing center periodically or when a preset trigger event is satisfied. As the above-mentioned trigger event, the following events may be listed:

an uplink cache of the target service is lower than a preset threshold;

a current reference signal receiving power of the user equipment is lower than a preset threshold;

a current signal interference noise ratio of the user equipment is lower than a preset threshold;

a current channel quality of the user equipment is lower than a preset threshold;

a current reference signal receiving power of the user equipment is lower than a preset threshold;

a current remaining battery of the user equipment is lower than a preset threshold;

It should be understood that, the trigger events listed above are merely exemplary illustration, and the present disclosure is not limited hereto.

Moreover, as the above-mentioned communication state, the following information may be listed:

an uplink cache of the target service;

a current reference signal receiving power of the user equipment;

a current channel quality of the user equipment;

a current signal interference noise ratio of the user equipment;

a communication technology the user equipment is capable of supporting;

a current remaining battery of the user equipment.

It should be understood that, the information used as the communication state and listed above is merely exemplary illustration, and the present disclosure is not limited hereto.

When the location of the user equipment in the communication system is located within the coverage of the access end device (the second access end device) providing no service to the user equipment, the processing center may judge whether the current communication state of the first access end device satisfies a preset offloading policy or not.

As the above-mentioned preset offloading policy, the following policy may be listed:

c. if access of the user equipment to the target service may be influenced at the current communication state of the user equipment, namely, the user experience is influenced, the target service needs to be offloaded.

It should be understood that, the offloading policy listed above is merely exemplary illustration, and the present disclosure is not limited hereto.

Therefore, under the condition of determining that the target service needs to be offloaded, the processing center may instruct the user equipment to access a part of services (an example of the first target service) or all services (another example of the first target service) via the second access end device.

According to the wireless communication method provided by the embodiment of the present disclosure, since the user equipment reports the current communication state of the user equipment to the processing center, offloading may be performed dynamically and intelligently in real time. The user experience is effectively improved.

Optionally, in an embodiment of the present disclosure, the method further includes:

receiving fourth indication information sent by the second access end device, wherein the fourth indication information is used for indicating a current communication state of the second access end device; and the determining that the user equipment is capable of accessing the first target service via the second access end device according to the location of the user equipment in the communication system and the coverage of the second access end device in the at least two access end devices, includes:

determining that the user equipment is capable of accessing the first target service via the second access end device according to the location of the user equipment in the communication system, the coverage of the second access end device in the at least two access end devices and the fourth indication information.

Moreover, the fourth indication information is used for indicating at least one of the following:

a current resource allocation of the second access end device, and a current load rate of the second access end device.

Specifically, in the embodiment of the present disclosure, the second access end device may report information (an example of the fourth indication information) indicating the current communication state of the second access end device to the processing center periodically or when a preset trigger event is satisfied. As the above-mentioned trigger event, the following events may be listed:

an unused resource of the second access end device is higher than a preset threshold;

a current load rate of the second access end device is lower than a preset threshold.

It should be understood that, the trigger events listed above are merely exemplary illustration, and the present disclosure is not limited hereto.

Moreover, as the above-mentioned communication state, the following information may be listed:

resources which the second access end device is capable of allocating;

a current load rate of the second access end device.

It should be understood that, the information used as the communication state and listed above is merely exemplary illustration, and the present disclosure is not limited hereto.

When the location of the user equipment in the communication system is located within the coverage of the access end device (the second access end device) providing no service to the user equipment, the processing center may judge whether the current communication state of the second access end device satisfies a preset offloading policy or not.

As the above-mentioned preset offloading policy, the following policy may be listed:

d. if the user experience may be improved by providing service to the user equipment at the current communication state of the second access end device, the target service needs to be offloaded.

It should be understood that, the offloading policy listed above is merely exemplary illustration, and the present disclosure is not limited hereto.

Therefore, under the condition of determining that the target service needs to be offloaded, the processing center may instruct the user equipment to access a part of services (an example of the first target service) or all services (another example of the first target service) via the second access end device.

According to the wireless communication method provided by the embodiment of the present disclosure, since the second access end device reports the current communication state of the second access end device to the processing center, offloading may be performed dynamically and intelligently in real time. The user experience is effectively improved.

The condition that one access end device transmits data via a plurality of routing paths will be illustrated below taking a second access end device as an example.

Optionally, in an embodiment of the present disclosure, the second access end device is capable of accessing to an internet via any port of at least two ports of a first gateway device, and the method further includes:

determining communication capacities of the at least two ports;

receiving fifth indication information sent by the first gateway device, wherein the fifth indication information is used for indicating current communication states of the at least two ports;

determining a first port from the at least two ports according to the fifth indication information; and sending sixth indication information used for indicating the first port to the second access end device, for enabling the second access end device to transmit the first target service via the first port.

Moreover, the fifth indication information is used for indicating at least one of the following:

current link states of the at least two ports, and current load rates of the at least two ports.

Specifically, in the embodiment of the present disclosure, when the second access end device is capable of accessing to the internet via any port of the at least two ports of the first gateway device, the processing center may obtain information indicating the communication capacity of each gateway device (including the first gateway device) used in the communication system, which herein specifically refers to the communication capacity of each port, for example, a supportable maximum rate of each port, and the like. For example, the processing center may determine the communication capacity of the gateway device according to a model number of the gateway device, and may also receive the information indicating the communication capacity of the gateway device sent by each gateway device periodically or at one time. It should be understood that, the embodiment of the processing center for obtaining the information indicating the communication capacity of each gateway device used in the communication system listed above is merely exemplary illustration, and the present disclosure is not limited hereto.

In the embodiment of the present disclosure, the gateway device may report information (an example of the fifth indication information) indicating the current communication state of the gateway device to the processing center periodically or when a preset trigger event is satisfied. As the above-mentioned trigger event, the following events may be listed:

a link state of the port changes (changing from normal to abnormal, or changing from abnormal to normal);

a current load rate of the port is higher than a preset threshold.

It should be understood that, the trigger events listed above are merely exemplary illustration, and the present disclosure is not limited hereto.

Moreover, as the above-mentioned communication state, the following information may be listed:

a link state of the port;

a current load rate of the port;

It should be understood that, the information used as the communication state and listed above is merely exemplary illustration, and the present disclosure is not limited hereto.

When the location of the user equipment in the communication system is located within the coverage of the access end device (the second access end device) providing no service to the user equipment, the processing center may judge whether the communication state of the port of the gateway device satisfies a preset offloading policy or not.

As the above-mentioned preset offloading policy, the following policies may be listed:

e, if a certain port (the first port) of the gateway device may transmit the target service (the link state satisfies the requirement), the target service needs to be offloaded;

f, if the user experience of other user equipment will not be influenced by using a certain port (the first port) of the gateway device (the load rate is lower), the target service needs to be offloaded.

It should be understood that, the offloading policies listed above are merely exemplary illustration, and the present disclosure is not limited hereto.

Therefore, under the condition of determining that the target service needs to be offloaded, the processing center may instruct the user equipment to access a part of services (an example of the first target service) or all services (another example of the first target service) via the second access end device.

Moreover, the processing center may send information (an example of the sixth indication information) indicating the first port to the second access end device. Such that, the second access end device accesses a part of services (an example of the first target service) or all services (another example of the first target service) via the first port.

According to the wireless communication method provided by the embodiment of the present disclosure, since the gateway device reports the current communication state of the gateway device to the processing center, offloading may be performed dynamically and intelligently in real time. The user experience is effectively improved.

Optionally, the second access end device is capable of accessing to the internet via any gateway device of at least two gateway devices, and the method further includes:

determining communication capacities of ports of the at least two second gateway devices;

receiving seventh indication information sent by the at least two second gateway devices, wherein the seventh indication information is used for indicating current communication states of the ports of the at least two second gateway devices;

determining a target second gateway device from the at least two second gateway devices according to the seventh indication information; and sending eighth indication information used for indicating the target second gateway device to the second access end device, for enabling the second access end device to transmit the first target service via the target second gateway device.

Moreover, the seventh indication information is used for indicating at least one of the following:

a current link state of the port of the second gateway device, and a current load rate of the port of the second gateway device.

Figure 3:
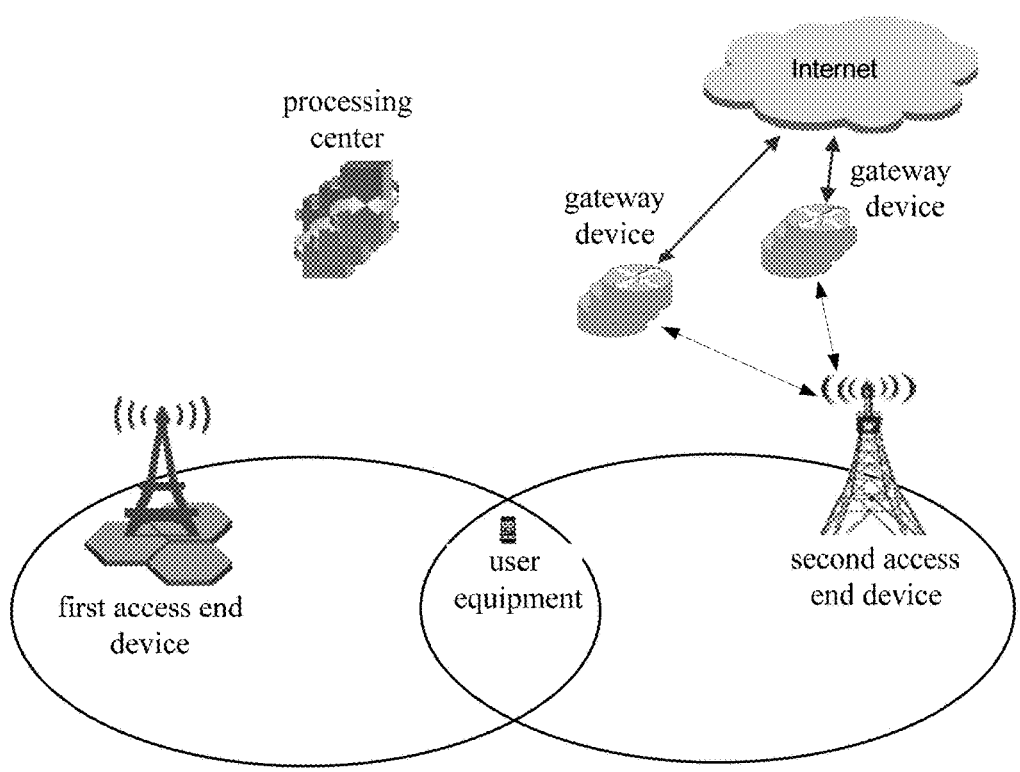
FIG. 3 is a schematic diagram of a structure of a wireless communication system according to another embodiment of the present disclosure.

Specifically, in the embodiment of the present disclosure, as shown in FIG. 3, when the second access end device is capable of accessing to the internet via any gateway device of the at least two gateway devices (second gateway devices), the processing center may obtain information indicating the communication capacity of each gateway device (including the second gateway devices) used in the communication system, which herein specifically refers to the communication capacity of each port, for example, a supportable maximum rate of each port, and the like. For example, the processing center may determine the communication capacity of the gateway device according to a model number of the gateway device, and may also receive the information indicating the communication capacity of the gateway device sent by each gateway device periodically or at one time. It should be understood that, the embodiment of the processing center for obtaining the information indicating the communication capacity of each gateway device used in the communication system listed above is merely exemplary illustration, and the present disclosure is not limited hereto.

In the embodiment of the present disclosure, the gateway device may report information (an example of the fifth indication information) indicating the current communication state of the gateway device to the processing center periodically or when a preset trigger event is satisfied. As the above-mentioned trigger event, the following events may be listed:

a link state of the port changes (changing from normal to abnormal, or changing from abnormal to normal);

a current load rate of the port is higher than a preset threshold.

It should be understood that, the trigger events listed above are merely exemplary illustration, and the present disclosure is not limited hereto.

Moreover, as the above-mentioned communication state, the following information may be listed:
a link state of the port;
a current load rate of the port;
It should be understood that, the information used as the communication state and listed above is merely exemplary illustration, and the present disclosure is not limited hereto.

When the location of the user equipment in the communication system is located within the coverage of the access end device (the second access end device) providing no service to the user equipment, the processing center may judge whether the communication state of the port of the gateway device satisfies a preset offloading policy or not.

As the above-mentioned preset offloading policy, the following policies may be listed:
g, if a certain gateway device (the target second gateway device) may transmit the target service (the link state satisfies the requirement), the target service needs to be offloaded;
h, if the user experience of other user equipment will not be influenced by using a certain gateway device (the target second gateway device) (the load rate is lower), the target service needs to be offloaded.

It should be understood that, the offloading policies listed above are merely exemplary illustration, and the present disclosure is not limited hereto.

Therefore, under the condition of determining that the target service needs to be offloaded, the processing center may instruct the user equipment to access a part of services (an example of the first target service) or all services (another example of the first target service) via the second access end device.

Moreover, the processing center may send information (an example of the eighth indication information) indicating the first gateway device to the second access end device. So that, the second access end device accesses a part of services (an example of the first target service) or all services (another example of the first target service) via the first gateway device.

According to the wireless communication method provided by the embodiment of the present disclosure, since the gateway device reports the current communication state of the gateway device to the processing center, offloading may be performed dynamically and intelligently in real time. The user experience is effectively improved.

Figure 4:
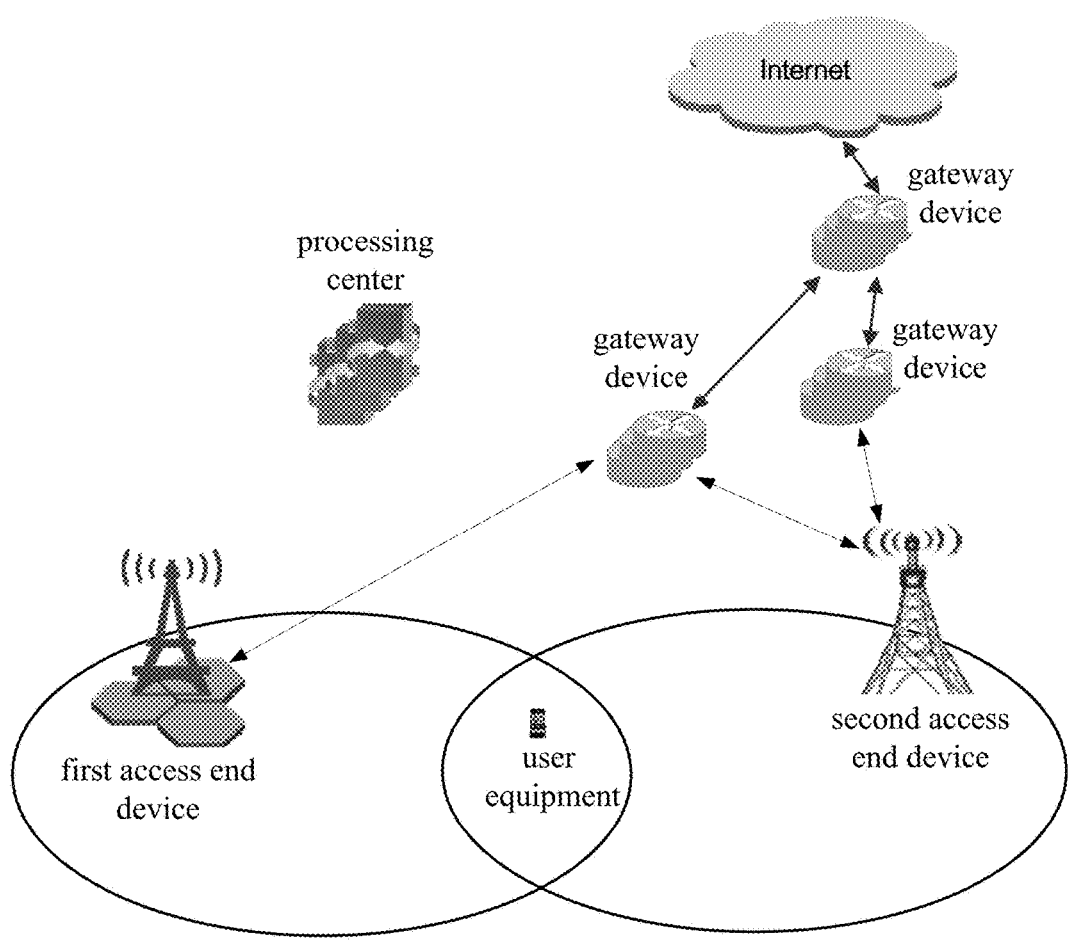
FIG. 4 is a schematic diagram of a structure of a wireless communication system according to another embodiment of the present disclosure.

It should be noted that, as shown in FIG. 4, under the condition that data transmitted between the internet and the first access end device need to pass by a plurality of gateway devices (at least two), the processing center may also determine a routing structure of the communication system, for example, an address of each gateway device (or the port of the gateway device) and the address of a next hop, moreover, the address may be a medium access control (MAC) address, an internet protocol (IP) address and the like. In the embodiment of the present disclosure, the processing center may obtain a topological structure from a network operator, or each gateway device may report its address and the address of the next hop to the processing center periodically or at one time. This is not particularly limited in the present disclosure.

It should be understood that, the preset offloading policies a-h listed above may be used singly or properly combined for use, and this is not particularly limited in the present disclosure.

In S140, the processing center may send information (an example of the first indication information) indicating a network identity of the second access end device to the user equipment, therefore the user equipment may determine the second access end device according to the network identity of the second access end device, start a communication module corresponding to the second access end device, and initiate a flow of accessing the first target service. In the embodiment of the present disclosure, a method of the user equipment for initiating the flow of accessing the first target service to the second access end device is the same as that in the prior art, thus in order to avoid repetition, the illustration thereof is omitted herein.

It should be noted that, in the embodiment of the present disclosure, the communication of the processing center and other network elements may adopt a wired communication manner, may also adopt a wireless communication manner, or a combined manner of the wired communication manner and the wireless communication manner, and this is not particularly limited in the present disclosure.

According to the wireless communication method in the embodiment of the present disclosure, at least two access end devices access to the internet via the same gateway device, the user equipment accesses the target service via the first access end device in the at least two access end devices, if the user equipment is within the coverage of the second access end device, the processing center may determine that the second access end device may serve the user equipment, thus may instruct the user equipment to access the target service via the second access end device to offload the first access end device, since the at least two access end devices access to the internet via the same gateway device, even if the first access end device is of a UMTS technology and the second access end device is of an LTE technology, the first access end device may be offloaded by the second access end device, so that the offloading effect may be improved.

FIG. 5 shows a schematic flowchart of a wireless communication method 200 according to an embodiment of the present disclosure and described from an angle of a user equipment, as shown in FIG. 5, the method 200 includes:

S210, receiving, by a user equipment in a communication system, first indication information used for indicating that the user equipment accesses a first target service via a second access end device and sent by a processing center, wherein the user equipment accesses a target service via a first access end device in the at least two access end devices, the first indication information is sent by the processing center when the processing center determines that the user equipment is capable of accessing the first target service via the second access end device in the at least two access end devices according to coverages of the at least two access end devices and a location of the user equipment, communication technologies of the at least two access end devices are different, or carrier frequencies used by the at least two access end devices are different;

S220, accessing the first target service via the second access end device according to the first indication information.

Specifically, in the embodiment of the present disclosure, for example, the processing center may obtain information indicating the coverage of each access end device in the commutation system (e.g., the information may indicate a location and a radiation range of the access end device) from each mobile operator, and may also receive the information indicating the coverage of the access end device in the commutation system (e.g., the information may indicate the location and the radiation range of the access end device) sent periodically or at one time by each access end device, and the processing center may determine the coverage of the access end device in the system in the communication system. It should be understood that, the embodiment of indicating the coverage of the access end device in the communication system via the location and the radiation power of the access end device listed above is merely exemplary illustration, and the present disclosure is not limited hereto.

Moreover, the processing center may determine the location of the user equipment.

For example, in the embodiment of the present disclosure, the user equipment has accessed the service (target service) via the first access end device, thus, when having a function of locating the user equipment, the first access end device may send information indicating the location of the user equipment to the processing center, so that the processing center may determine the location of the user equipment according to the information. Moreover, in the embodiment of the present disclosure, a method of the first access end device for locating the user equipment is the same as that in the prior art, thus in order to avoid repetition, the illustration thereof is omitted herein.

In this way, by reporting the location of the user equipment to the processing center via the first access end device, air interface resources may be saved.

Optionally, the method further includes:

sending ninth indication information to the processing center, wherein the ninth indication information is used for indicating the location of the user equipment in the communication system, for enabling the processing center to determine the location of the user equipment in the communication system according to the ninth indication information.

Specifically, in the embodiment of the present disclosure, when having a function of locating itself, the user equipment may directly send the information indicating the location of the user equipment to the processing center, such that the processing center may determine the location of the user equipment according to the information. Moreover, in the embodiment of the present disclosure, a method of the user equipment for locating itself is the same as that in the prior art, thus in order to avoid repetition, the illustration thereof is omitted herein.

In this way, by reporting the location of the user equipment to the processing center via the user equipment, the instantaneity of the processing center for determining the location of the user equipment may be improved.

As another example, in the embodiment of the present disclosure, the processing center may locate the user equipment according to a signal from the user equipment, in order to determine the location of the user equipment, moreover, in the embodiment of the present disclosure, a method of the processing center for locating the user equipment according to the signal from the user equipment is the same as that in the prior art, thus in order to avoid repetition, the illustration thereof is omitted herein.

As another example, in the embodiment of the present disclosure, the processing center may obtain the information indicating the location of the user equipment from a service provider providing a locating service, so that the processing center may determine the location of the user equipment according to the information.

When the location of the user equipment in the communication system is located within the coverage of the access end device (the second access end device) providing no service to the user equipment, the processing center may determine that the second access end device may serve the user equipment, or the user equipment is capable of accessing the service (the target service) via the second access end device.

Optionally, in an embodiment of the present disclosure, the method further includes:

sending third indication information to the processing center, wherein the third indication information is used for indicating a current communication state of the user equipment, for enabling the processing center to determine that the user equipment is capable of accessing the first target service via the second access end device according to the coverage of the at least two access end devices, the location of the user equipment and the third indication information.

Moreover, the third indication information is used for indicating at least one of the following:

a current uplink cache state of the user equipment aiming at the target service, a current reference signal receiving power of the user equipment, a current signal interference noise ratio of the user equipment, a current channel quality of the user equipment, a communication technology the user equipment is capable of supporting and a current remaining battery of the user equipment.

Specifically, in the embodiment of the present disclosure, the user equipment may report information (an example of the third indication information) indicating the current communication state of the user equipment to the processing center periodically or when a preset trigger event is satisfied. As the above-mentioned trigger event, the following events may be listed:

an uplink cache of the target service is lower than a preset threshold;

a current reference signal receiving power of the user equipment is lower than a preset threshold;

a current signal interference noise ratio of the user equipment is lower than a preset threshold;

a current channel quality of the user equipment is lower than a preset threshold;

a current reference signal receiving power of the user equipment is lower than a preset threshold;

a current remaining battery of the user equipment is lower than a preset threshold.

It should be understood that, the trigger events listed above are merely exemplary illustration, and the present disclosure is not limited hereto.

Moreover, as the above-mentioned communication state, the following information may be listed:

an uplink cache of the target service;

a current reference signal receiving power of the user equipment;

a current channel quality of the user equipment;

a current signal interference noise ratio of the user equipment;

a communication technology the user equipment is capable of supporting;

a current remaining battery of the user equipment.

It should be understood that, the information used as the communication state and listed above is merely exemplary illustration, and the present disclosure is not limited hereto.

When the location of the user equipment in the communication system is located within the coverage of the access end device (the second access end device) providing no service to the user equipment, the processing center may judge whether the current communication state of the first access end device satisfies a preset offloading policy or not.

As the above-mentioned preset offloading policy, the following policy may be listed:

c. if access of the user equipment to the target service may be influenced at the current communication state of the user equipment, namely, the user experience is influenced, the target service needs to be offloaded.

It should be understood that, the offloading policy listed above is merely exemplary illustration, and the present disclosure is not limited hereto.

Therefore, under the condition of determining that the target service needs to be offloaded, the processing center may instruct the user equipment to access a part of services (an example of the first target service) or all services (another example of the first target service) via the second access end device.

According to the wireless communication method provided by the embodiment of the present disclosure, since the user equipment reports the current communication state of the user equipment to the processing center, offloading may be performed dynamically and intelligently in real time. The user experience is effectively improved.

Therefore, the processing center may send information (an example of the first indication information) indicating a network identity of the second access end device to the user equipment, in S210, the user equipment may obtain the first indication information, in S220, the user equipment may determine the second access end device according to the network identity of the second access end device, start a communication module corresponding to the second access end device, and initiate a flow of accessing the first target service. In the embodiment of the present disclosure, a method of the user equipment for initiating the flow of accessing the first target service to the second access end device is the same as that in the prior art, thus in order to avoid repetition, the illustration thereof is omitted herein.

According to the wireless communication method in the embodiment of the present disclosure, at least two access end devices access to the internet via the same gateway device, the user equipment accesses the target service via the first access end device in the at least two access end devices, if the user equipment is within the coverage of the second access end device, the processing center may determine that the second access end device may serve the user equipment, thus may instruct the user equipment to access the target service via the second access end device to offload the first access end device, since the at least two access end devices access to the internet via the same gateway device, even if the first access end device is of a UMTS technology and the second access end device is of an LTE technology, the first access end device may be offloaded by the second access end device, so that the offloading effect may be improved.

FIG. 6 shows a schematic flowchart of a wireless communication method 300 according to an embodiment of the present disclosure and described from an angle of an access end device, as shown in FIG. 6, the method 300 includes:

S310, sending, by a third access end device in a communication system, tenth indication information to a processing center, wherein the tenth indication information is used for indicating a current communication state of the third access end device, for enabling the processing center to control access of a user equipment to a target service according to a location of the user equipment in the communication system, a coverage of the third access end device or a fourth access end device in the communication system and the tenth indication information, wherein communication technologies of the third access end device and the fourth access end device are different, or carrier frequencies used by the third access end device and the fourth access end device are different.

The processing center may obtain information indicating the coverage of each access end device in the commutation system (e.g., the information may indicate a location and a radiation range of the access end device) from each mobile operator, and may also receive the information indicating the coverage of the access end device in the commutation system (e.g., the information may indicate the location and the radiation range of the access end device) sent periodically or at one time by each access end device, and the processing center may determine the coverage of the access end device in the system in the communication system. It should be understood that, the embodiment of indicating the coverage of the access end device in the communication system via the location and the radiation power of the access end device listed above is merely exemplary illustration, and the present disclosure is not limited hereto.

In the embodiment of the present disclosure, the third access end device may be an access end device (corresponding to the first access end device mentioned above) serving the user equipment, namely, the user equipment accesses the target service (i.e., condition 1) via the third access end device. Moreover, the third access end device may also be an access end device (corresponding to the second access end device mentioned above, i.e., condition 2) providing no service to the user equipment. The actions of the two conditions will be respectively illustrated below.

Condition 1

Optionally, if the user equipment accesses the target service via the third access end device, the method further includes:

sending twelfth indication information to the processing center, wherein the twelfth indication information is used for indicating the location of the user equipment in the communication system, for enabling the processing center to determine the location of the user equipment in the communication system according to the twelfth indication information.

In the embodiment of the present disclosure, the user equipment has accessed the service via the third access end device (the third access end device is equivalent to the first access end device mentioned above), thus, when having a function of locating the user equipment, the third access end device may send information indicating the location of the user equipment to the processing center, such that the processing center may determine the location of the user equipment according to the information. Moreover, in the embodiment of the present disclosure, a method of the third access end device for locating the user equipment is the same as that in the prior art, thus in order to avoid repetition, the illustration thereof is omitted herein.

In this way, by reporting the location of the user equipment to the processing center via the third access end device, air interface resources may be saved.

In addition, in the embodiment of the present disclosure, when having a function of locating itself, the user equipment may directly send the information indicating the location of the user equipment to the processing center, such that the processing center may determine the location of the user equipment according to the information. Moreover, in the embodiment of the present disclosure, a method of the user equipment for locating itself is the same as that in the prior art, thus in order to avoid repetition, the illustration thereof is omitted herein.

In this way, by reporting the location of the user equipment to the processing center via the user equipment, the instantaneity of the processing center for determining the location of the user equipment may be improved.

As another example, in the embodiment of the present disclosure, the processing center may locate the user equipment according to a signal from the user equipment, in order to determine the location of the user equipment, moreover, in the embodiment of the present disclosure, a method of the processing center for locating the user equipment according to the signal from the user equipment is the same as that in the prior art, thus in order to avoid repetition, the illustration thereof is omitted herein.

As another example, in the embodiment of the present disclosure, the processing center may obtain the information indicating the location of the user equipment from a service provider providing a locating service, so that the processing center may determine the location of the user equipment according to the information.

When the location of the user equipment in the communication system is located within the coverage of the access end device (the second access end device) providing no service to the user equipment, the processing center may determine that the second access end device may serve the user equipment, or the user equipment is capable of accessing the service (the target service) via the second access end device.

Optionally, in an embodiment of the present disclosure, if the user equipment accesses the target service via the third access end device, the tenth indication information is used for indicating at least one of the following: a current downlink cache state of the third access end device aiming at the target service, a current resource allocation of the third access end device aiming at the target service, a current load rate of the third access end device and a current signal interference noise ratio of the user equipment.

Specifically, in the embodiment of the present disclosure, the third access end device may report information (an example of the tenth indication information) indicating the current communication state of the third access end device to the processing center periodically or when a preset trigger event is satisfied. As the above-mentioned trigger event, the following events may be listed:

a downlink cache of the target service is higher than a preset threshold;

a resource allocated to the user equipment is lower than a preset threshold;

a current load rate of the first access end device is higher than a preset threshold;

a current signal interference noise ratio of the user equipment is lower than a preset threshold.

It should be understood that, the trigger events listed above are merely exemplary illustration, and the present disclosure is not limited hereto.

Moreover, as the above-mentioned communication state, the following information may be listed:

a downlink cache of the target service;

a resource allocated to the user equipment;

a current load rate of the first access end device;

a current signal interference noise ratio of the user equipment.

It should be understood that, the information used as the communication state and listed above is merely exemplary illustration, and the present disclosure is not limited hereto.

When the location of the user equipment in the communication system is located within the coverage of the access end device (the fourth access end device) providing no service to the user equipment, the processing center may judge whether the current communication state of the first access end device satisfies a preset offloading policy or not.

As the above-mentioned preset offloading policy, the following policies may be listed:

i. if access of the user equipment to the target service may be influenced at the current communication state of the third access end device, namely, the user experience is influenced, the target service needs to be offloaded;

j. if continuous access to the target service at the current communication state of the third access end device may influence other user equipment, the target service needs to be offloaded.

It should be understood that, the offloading policies listed above are merely exemplary illustration, and the present disclosure is not limited hereto.

Therefore, under the condition of determining that the target service needs to be offloaded, the processing center may instruct the user equipment to access a part of services (an example of the first target service) or all services (another example of the first target service) via the fourth access end device.

According to the wireless communication method provided by the embodiment of the present disclosure, since the third access end device reports the current communication state of the third access end device to the processing center, offloading may be performed dynamically and intelligently in real time. The problem of mobile network traffic storm is effectively solved.

Condition 2

If the user equipment accesses the target service via the third access end device, the tenth indication information is used for indicating a current load rate of the third access end device.

Specifically, in the embodiment of the present disclosure, the third access end device may report information (an example of the tenth indication information) indicating the current communication state of the third access end device to the processing center periodically or when a preset trigger event is satisfied. As the above-mentioned trigger event, the following events may be listed:

an unused resource of the third access end device is higher than a preset threshold;

a current load rate of the third access end device is lower than a preset threshold.

It should be understood that, the trigger events listed above are merely exemplary illustration, and the present disclosure is not limited hereto.

Moreover, as the above-mentioned communication state, the following information may be listed:

resources which the third access end device is capable of allocating;

a current load rate of the third access end device.

It should be understood that, the information used as the communication state and listed above is merely exemplary illustration, and the present disclosure is not limited hereto.

When the location of the user equipment in the communication system is located within the coverage of the access end device (the third access end device) providing no service to the user equipment, the processing center may judge whether the current communication state of the third access end device satisfies a preset offloading policy or not.

As the above-mentioned preset offloading policy, the following policy may be listed:

k. if the user experience may be improved by providing service to the user equipment at the current communication state of the third access end device, the target service needs to be offloaded.

It should be understood that, the offloading policy listed above is merely exemplary illustration, and the present disclosure is not limited hereto.

Therefore, under the condition of determining that the target service needs to be offloaded, the processing center may instruct the user equipment to access a part of services (an example of the first target service) or all services (another example of the first target service) via the third access end device.

According to the wireless communication method provided by the embodiment of the present disclosure, since the third access end device reports the current communication state of the third access end device to the processing center, offloading may be performed dynamically and intelligently in real time. The user experience is effectively improved.

Optionally, the user equipment accesses the target service via the fourth access end device, the third access end device accesses to an internet via at least two ports of a first gateway device, and the method further includes:

receiving sixth indication information used for indicating a first port and sent by the processing center, wherein the first port is determined by the processing center according to communication capacities of the at least two ports and the current communication states of the ports of the first gateway device; and transmitting the first target service via the first port according to the sixth indication information.

Moreover, the current communication state of the port includes at least one of the following:

a current link state of the port, and a current load rate of the port.

Specifically, in the embodiment of the present disclosure, when the third access end device is capable of accessing to the internet via any port of at least two ports of the first gateway device, the processing center may obtain information indicating the communication capacity of each gateway device (including the first gateway device) used in the communication system, which herein specifically refers to the communication capacity of each port, for example, a supportable maximum rate of each port, and the like. For example, the processing center may determine the communication capacity of the gateway device according to a model number of the gateway device, and may also receive the information indicating the communication capacity of the gateway device sent by each gateway device periodically or at one time. It should be understood that, the embodiment of the processing center for obtaining the information indicating the communication capacity of each gateway device used in the communication system listed above is merely exemplary illustration, and the present disclosure is not limited hereto.

In the embodiment of the present disclosure, the gateway device may report information (an example of the fifth indication information) indicating the current communication state of the gateway device to the processing center periodically or when a preset trigger event is satisfied. As the above-mentioned trigger event, the following events may be listed:

a link state of the port changes (changing from normal to abnormal, or changing from abnormal to normal);

a current load rate of the port is higher than a preset threshold.

It should be understood that, the trigger events listed above are merely exemplary illustration, and the present disclosure is not limited hereto.

Moreover, as the above-mentioned communication state, the following information may be listed:

a link state of the port;

a current load rate of the port;

It should be understood that, the information used as the communication state and listed above is merely exemplary illustration, and the present disclosure is not limited hereto.

When the location of the user equipment in the communication system is located within the coverage of the access end device (the third access end device) providing no service to the user equipment, the processing center may judge whether the communication state of the port of the gateway device satisfies a preset offloading policy or not.

As the above-mentioned preset offloading policy, the following policies may be listed:

l, if a certain port (the first port) of the gateway device may transmit the target service (the link state satisfies the requirement), the target service needs to be offloaded;

m, if the user experience of other user equipment will not be influenced by using a certain port (the first port) of the gateway device (the load rate is lower), the target service needs to be offloaded.

It should be understood that, the offloading policies listed above are merely exemplary illustration, and the present disclosure is not limited hereto.

Therefore, under the condition of determining that the target service needs to be offloaded, the processing center may instruct the user equipment to access a part of services (an example of the first target service) or all services (another example of the first target service) via the third access end device.

Moreover, the processing center may send information (an example of the sixth indication information) indicating the first port to the third access end device, for enabling the third access end device to access a part of services (an example of the first target service) or all services (another example of the first target service) via the first port.

According to the wireless communication method provided by the embodiment of the present disclosure, since the gateway device reports the current communication state of the gateway device to the processing center, offloading may be performed dynamically and intelligently in real time. The user experience is effectively improved.

Optionally, the user equipment accesses the target service via the fourth access end device, the third access end device is capable of accessing to an internet via any gateway device of at least two second gateway devices, and the method further includes:

receiving eighth indication information used for indicating a target second gateway device and sent by the processing center, wherein the target second gateway device is determined by the processing center according to communication capacities of ports of the at least two second gateway devices and current communication states of the ports of the at least two second gateway devices; and transmitting the first target service via the target second gateway device according to the eighth indication information.

Moreover, the current communication state of the port includes at least one of the following:

a current link state of the port, and a current load rate of the port.

Specifically, in the embodiment of the present disclosure, as shown in FIG. 3, when the third access end device is capable of accessing to the internet via any gateway device of the at least two gateway devices (second gateway devices), the processing center may obtain information indicating the communication capacity of each gateway device (including the second gateway devices) used in the communication system, which herein specifically refers to the communication capacity of each port, for example, a supportable maximum rate of each port, and the like. For example, the processing center may determine the communication capacity of the gateway device according to a model number of the gateway device, and may also receive the information indicating the communication capacity of the gateway device sent by each gateway device periodically or at one time. It should be understood that, the embodiment of the processing center for obtaining the information indicating the communication capacity of each gateway device used in the communication system listed above is merely exemplary illustration, and the present disclosure is not limited hereto.

In the embodiment of the present disclosure, the gateway device may report information (an example of the fifth indication information) indicating the current communication state of the gateway device to the processing center periodically or when a preset trigger event is satisfied. As the above-mentioned trigger event, the following events may be listed:

a link state of the port changes (changing from normal to abnormal, or changing from abnormal to normal);

a current load rate of the port is higher than a preset threshold.

It should be understood that, the trigger events listed above are merely exemplary illustration, and the present disclosure is not limited hereto.

Moreover, as the above-mentioned communication state, the following information may be listed:

a link state of the port;

a current load rate of the port;

It should be understood that, the information used as the communication state and listed above is merely exemplary illustration, and the present disclosure is not limited hereto.

When the location of the user equipment in the communication system is located within the coverage of the access end device (the third access end device) providing no service to the user equipment, the processing center may judge whether the communication state of the port of the gateway device satisfies a preset offloading policy or not.

As the above-mentioned preset offloading policy, the following policies may be listed:

n, if a certain gateway device (the target second gateway device) may transmit the target service (the link state satisfies the requirement), the target service needs to be offloaded;

o, if the user experience of other user equipment will not be influenced by using a certain gateway device (the target second gateway device) (the load rate is lower), the target service needs to be offloaded.

It should be understood that, the offloading policies listed above are merely exemplary illustration, and the present disclosure is not limited hereto.

Therefore, under the condition of determining that the target service needs to be offloaded, the processing center may instruct the user equipment to access a part of services (an example of the first target service) or all services (another example of the first target service) via the third access end device.

Moreover, the processing center may send information (an example of the eighth indication information) indicating the first gateway device to the third access end device, for enabling the third access end device to access a part of services (an example of the first target service) or all services (another example of the first target service) via the first gateway device.

According to the wireless communication method provided by the embodiment of the present disclosure, since the gateway device reports the current communication state of the gateway device to the processing center, offloading may be performed dynamically and intelligently in real time. The user experience is effectively improved.

It should be noted that, as shown in FIG. 4, under the condition that data transmitted between the internet and the third access end device need to pass by a plurality of gateway devices (at least two), the processing center may also determine a routing structure of the communication system, for example, an addresses of each gateway device (or the port of the gateway device) and the address of a next hop, moreover, the address may be a medium access control (MAC) address, an internet protocol (IP) address and the like. In the embodiment of the present disclosure, the processing center may obtain a topological structure from a network operator, or each gateway device may report its address and the address of the next hop to the processing center periodically or at one time. This is not particularly limited in the present disclosure.

FIG. 7 shows a schematic flowchart of a wireless communication method 400 according to an embodiment of the present disclosure and described from an angle of a gateway device, as shown in FIG. 7, the method 400 includes:

S410, sending, by a gateway device in a communication system, eleventh indication information to a processing center, wherein the eleventh indication information is used for indicating a current communication state of a port of the gateway device, for enabling the processing center to determine that user equipment is capable of accessing a first target service via a second access end device by means of the gateway device, according to a location of the user equipment, which accesses a target service via a first access end device in at least two access end devices included in the communication system, in the communication system, a coverage of the second access end device in the at least two access end devices, a port capacity of the gateway device and the eleventh indication information, wherein the second access end device accesses to an internet via the gateway device, communication technologies of the at least two access end devices are different, or carrier frequencies used by the at least two access end devices are different.

Moreover, the eleventh indication information is used for indicating at least one of the following:

a current link state of the port of the gateway device, and a current load rate of the port of the gateway device.

Specifically, in the embodiment of the present disclosure, the processing center may obtain information indicating the coverage of each access end device in the commutation system (e.g., the information may indicate a location and a radiation range of the access end device) from each mobile operator, and may also receive the information indicating the coverage of the access end device in the commutation system (e.g., the information may indicate the location and the radiation range of the access end device) sent periodically or at one time by each access end device, and the processing center may determine the coverage of each access end device in the system in the communication system. It should be understood that, the embodiment of indicating the coverage of the access end device in the communication system via the location and the radiation power of the access end device listed above is merely exemplary illustration, and the present disclosure is not limited hereto.

For example, in the embodiment of the present disclosure, the user equipment has accessed the service (target service) via the first access end device, thus, when having a function of locating the user equipment, the first access end device may send information indicating the location of the user equipment to the processing center, so that the processing center may determine the location of the user equipment according to the information. Moreover, in the embodiment of the present disclosure, a method of the first access end device for locating the user equipment is the same as that in the prior art, thus in order to avoid repetition, the illustration thereof is omitted herein.

In this way, by reporting the location of the user equipment to the processing center via the first access end device, air interface resources may be saved.

As another example, in the embodiment of the present disclosure, when having a function of locating itself, the user equipment may directly send the information indicating the location of the user equipment to the processing center, so that the processing center may determine the location of the user equipment according to the information. Moreover, in the embodiment of the present disclosure, a method of the user equipment for locating itself is the same as that in the prior art, thus in order to avoid repetition, the illustration thereof is omitted herein.

In this way, by reporting the location of the user equipment to the processing center via the user equipment, the instantaneity of the processing center for determining the location of the user equipment may be improved.

As another example, in the embodiment of the present disclosure, the processing center may locate the user equipment according to a signal from the user equipment, in order to determine the location of the user equipment, moreover, in the embodiment of the present disclosure, a method of the processing center for locating the user equipment according to the signal from the user equipment is the same as that in the prior art, thus in order to avoid repetition, the illustration thereof is omitted herein.

As another example, in the embodiment of the present disclosure, the processing center may obtain the information indicating the location of the user equipment from a service provider providing a locating service, so that the processing center may determine the location of the user equipment according to the information.

When the location of the user equipment in the communication system is located within the coverage of the access end device (the second access end device) providing no service to the user equipment, the processing center may determine that the second access end device may serve the user equipment, or the user equipment is capable of accessing the service (the target service) via the second access end device.

On one hand, when the second access end device is capable of accessing to the internet via any port of at least two ports of the gateway device, the processing center may obtain information indicating the communication capacity of each gateway device used in the communication system, which herein specifically refers to the communication capacity of each port, for example, a supportable maximum rate of each port, and the like. For example, the processing center may determine the communication capacity of the gateway device according to a model number of the gateway device, and may also receive the information indicating the communication capacity of the gateway device sent by each gateway device periodically or at one time. It should be understood that, the embodiment of the processing center for obtaining the information indicating the communication capacity of each gateway device used in the communication system listed above is merely exemplary illustration, and the present disclosure is not limited hereto.

In the embodiment of the present disclosure, the gateway device may report information (an example of the fifth indication information) indicating the current communication state of the gateway device to the processing center periodically or when a preset trigger event is satisfied. As the above-mentioned trigger event, the following events may be listed:

a link state of the port changes (changing from normal to abnormal, or changing from abnormal to normal);

a current load rate of the port is higher than a preset threshold.

It should be understood that, the trigger events listed above are merely exemplary illustration, and the present disclosure is not limited hereto.

Moreover, as the above-mentioned communication state, the following information may be listed:

a link state of the port;

a current load rate of the port;

It should be understood that, the information used as the communication state and listed above is merely exemplary illustration, and the present disclosure is not limited hereto.

When the location of the user equipment in the communication system is located within the coverage of the access end device (the second access end device) providing no service to the user equipment, the processing center may judge whether the communication state of the port of the gateway device satisfies a preset offloading policy or not.

As the above-mentioned preset offloading policy, the following policies may be listed:

p, if a certain port of the gateway device may transmit the target service (the link state satisfies the requirement), the target service needs to be offloaded;

q, if the user experience of other user equipment will not be influenced by using a certain port of the gateway device (the load rate is lower), the target service needs to be offloaded.

It should be understood that, the offloading policies listed above are merely exemplary illustration, and the present disclosure is not limited hereto.

Therefore, under the condition of determining that the target service needs to be offloaded, the processing center may instruct the user equipment to access a part of services (an example of the first target service) or all services (another example of the first target service) via the second access end device.

Moreover, the processing center may send information (an example of the sixth indication information) indicating the first port to the second access end device. Such that, the second access end device accesses a part of services (an example of the first target service) or all services (another example of the first target service) via the first port.

According to the wireless communication method provided by the embodiment of the present disclosure, since the gateway device reports the current communication state of the gateway device to the processing center, offloading may be performed dynamically and intelligently in real time. The user experience is effectively improved.

On another hand, as shown in FIG. 3, when the second access end device is capable of accessing to the internet via any gateway device of the at least two gateway devices, the processing center may obtain information indicating the communication capacity of each gateway device used in the communication system, which herein specifically refers to the communication capacity of each port, for example, a supportable maximum rate of each port, and the like. For example, the processing center may determine the communication capacity of the gateway device according to a model number of the gateway device, and may also receive the information indicating the communication capacity of the gateway device sent by each gateway device periodically or at one time. It should be understood that, the embodiment of the processing center for obtaining the information indicating the communication capacity of each gateway device used in the communication system listed above is merely exemplary illustration, and the present disclosure is not limited hereto.

In the embodiment of the present disclosure, the gateway device may report information (an example of the fifth indication information) indicating the current communication state of the gateway device to the processing center periodically or when a preset trigger event is satisfied. As the above-mentioned trigger event, the following events may be listed:

a link state of the port changes (changing from normal to abnormal, or changing from abnormal to normal);

a current load rate of the port is higher than a preset threshold.

It should be understood that, the trigger events listed above are merely exemplary illustration, and the present disclosure is not limited hereto.

Moreover, as the above-mentioned communication state, the following information may be listed:

a link state of the port;

a current load rate of the port;

It should be understood that, the information used as the communication state and listed above is merely exemplary illustration, and the present disclosure is not limited hereto.

When the location of the user equipment in the communication system is located within the coverage of the access end device (the second access end device) providing no service to the user equipment, the processing center may judge whether the communication state of the port of the gateway device satisfies a preset offloading policy or not.

As the above-mentioned preset offloading policy, the following policies may be listed:

r, if the gateway device may transmit the target service (the link state satisfies the requirement), the target service needs to be offloaded;

s, if the user experience of other user equipment will not be influenced by using the gateway device (the load rate is lower), the target service needs to be offloaded.

It should be understood that, the offloading policies listed above are merely exemplary illustration, and the present disclosure is not limited hereto.

Therefore, under the condition of determining that the target service needs to be offloaded, the processing center may instruct the user equipment to access a part of services (an example of the first target service) or all services (another example of the first target service) via the second access end device.

Moreover, the processing center may send information (an example of the eighth indication information) indicating the first gateway device to the second access end device. So that, the second access end device accesses a part of services (an example of the first target service) or all services (another example of the first target service) via the first gateway device.

According to the wireless communication method provided by the embodiment of the present disclosure, since the gateway device reports the current communication state of the gateway device to the processing center, offloading may be performed dynamically and intelligently in real time. The user experience is effectively improved.

It should be noted that, as shown in FIG. 4, under the condition that data transmitted between the internet and the first access end device need to pass by a plurality of gateway devices (at least two), the processing center may also determine a routing structure of the communication system, for example, an addresses of each gateway device (or the port of the gateway device) and the address of a next hop, moreover, the address may be a medium access control (MAC) address, an internet protocol (IP) address and the like. In the embodiment of the present disclosure, the processing center may obtain a topological structure from a network operator, or each gateway device may report its address and the address of the next hop to the processing center periodically or at one time. This is not particularly limited in the present disclosure.

The wireless communication method according to the embodiment of the present disclosure has been described above in detail in combination with FIG. 1 to FIG. 7, and a wireless communication apparatus according to the embodiment of the present disclosure will be described below in detail in combination with FIG. 8 to FIG. 11.

FIG. 8 shows a schematic block diagram of a wireless communication apparatus 500 according to an embodiment of the present disclosure. As shown in FIG. 8, the apparatus 500 includes:

a processing unit 510, configured to enable a processing center in a communication system to determine coverages of at least two access end devices included in the communication system;

determine a location of a user equipment, which accesses a target service via a first access end device in the at least two access end devices, in the communication system; and determine that the user equipment is capable of accessing a first target service via a second access end device according to the location of the user equipment in the communication system and a coverage of the second access end device in the at least two access end devices, wherein a communication technology of the first access end device is different from a communication technology of the second access end device, or a carrier frequency used by the first access end device is different from a carrier frequency used by the second access end device;

a sending unit 520, configured to send first indication information used for indicating that the user equipment accesses the first target service via the second access end device to the user equipment.

Optionally, the apparatus 500 further includes:

a receiving unit 530, configured to receive second indication information sent by the first access end device, wherein the second indication information is used for indicating a current communication state of the first access end device; and the processing unit 510 is specifically configured to determine that the user equipment is capable of accessing the first target service via the second access end device according to the location of the user equipment in the communication system, the coverage of the second access end device in the at least two access end devices and the second indication information.

Optionally, the second indication information is used for indicating at least one of the following:

a current downlink cache state of the first access end device aiming at the target service, a current resource allocation of the first access end device aiming at the target service, a current load rate of the first access end device and a current signal interference noise ratio of the user equipment.

Optionally, the apparatus 500 further includes:

a receiving unit 530, configured to receive third indication information sent by the user equipment, wherein the third indication information is used for indicating a current communication state of the user equipment; and the processing unit 510 is specifically configured to determine that the user equipment is capable of accessing the first target service via the second access end device according to the location of the user equipment in the communication system, the coverage of the second access end device in the at least two access end devices and the third indication information.

Optionally, the third indication information is used for indicating at least one of the following:

a current uplink cache state of the user equipment aiming at the target service, a current reference signal receiving power of the user equipment, a current signal interference noise ratio of the user equipment, a current channel quality of the user equipment, a communication technology the user equipment is capable of supporting and a current remaining battery of the user equipment.

Optionally, the apparatus 500 further includes:

a receiving unit 530, configured to receive fourth indication information sent by the second access end device, wherein the fourth indication information is used for indicating a current communication state of the second access end device; and the processing unit 510 is specifically configured to determine that the user equipment is capable of accessing the first target service via the second access end device according to the location of the user equipment in the communication system, the coverage of the second access end device in the at least two access end devices and the fourth indication information.

Optionally, the fourth indication information is used for indicating at least one of the following:

a current resource allocation of the second access end device, and a current load rate of the second access end device.

Optionally, the second access end device is capable of accessing to an internet via any port of at least two ports of a first gateway device, and the processing unit 510 is further configured to determine communication capacities of the at least two ports;

the apparatus 500 further includes:

a receiving unit 530, configured to receive fifth indication information sent by the first gateway device, wherein the fifth indication information is used for indicating current communication states of the at least two ports;

the processing unit 510 is further configured to determine a first port from the at least two ports according to the communication capacities of the at least two ports and the fifth indication information;

the sending unit 520 is further configured to send sixth indication information used for indicating the first port to the second access end device, for enabling the second access end device to transmit the first target service via the first port.

Optionally, the fifth indication information is used for indicating at least one of the following:

current link states of the at least two ports, and current load rates of the at least two ports.

Optionally, the second access end device is capable of accessing to an internet via any gateway device of at least two gateway devices, and the processing unit 510 is further configured to determine communication capacities of ports of the at least two second gateway devices;

the apparatus 500 further includes:

a receiving unit 530, configured to receive seventh indication information sent by the at least two second gateway devices, wherein the seventh indication information is used for indicating current communication states of the ports of the at least two second gateway devices;

the processing unit 510 is further configured to determine a target second gateway device from the at least two second gateway devices according to the communication capacities of the ports of the at least two second gateway devices and the seventh indication information;

the sending unit 520 is further configured to send eighth indication information used for indicating the target second gateway device to the second access end device, for enabling the second access end device to transmit the first target service via the target second gateway device.

Optionally, the seventh indication information is used for indicating at least one of the following:

a current link state of the port of the second gateway device, and a current load rate of the port of the second gateway device.

The wireless communication apparatus 500 according to the embodiment of the present disclosure may correspond to the processing center in the method in the embodiment of the present disclosure, moreover, the units, namely, modules in the wireless communication apparatus 500 and the above-mentioned other operations and/or functions are respectively used for achieving corresponding procedures of the method 100 in FIG. 1, and for concision, they will not be repeated redundantly herein.

According to the wireless communication apparatus in the embodiment of the present disclosure, at least two access end devices access to the internet via the same gateway device, the user equipment accesses the target service via the first access end device in the at least two access end devices, if the user equipment is within the coverage of the second access end device, the processing center may determine that the second access end device may serve the user equipment, thus may instruct the user equipment to access the target service via the second access end device to offload the first access end device, since the at least two access end devices access to the internet via the same gateway device, even if the first access end device is of a UMTS technology and the second access end device is of an LTE technology, the first access end device may be offloaded by the second access end device, so that the offloading effect may be improved.

Figure 9:
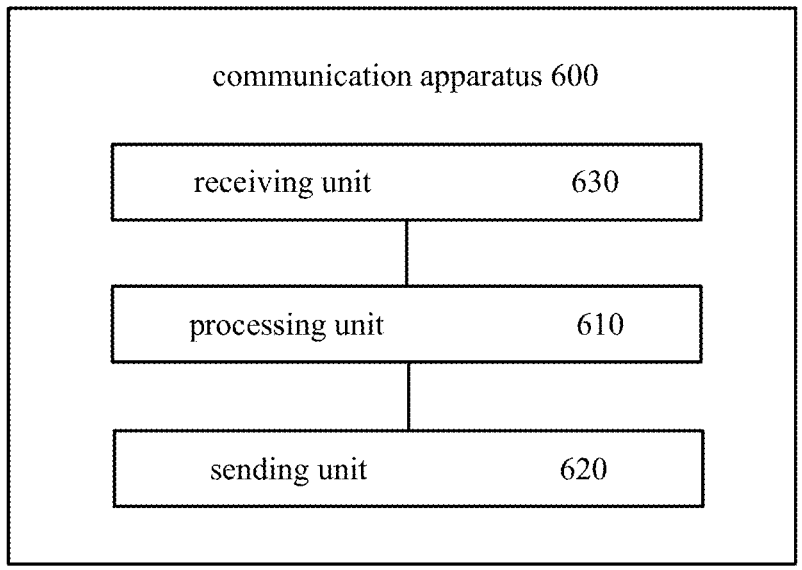
FIG. 9 is a schematic block diagram of a wireless communication apparatus according to another embodiment of the present disclosure.

FIG. 9 shows a schematic block diagram of a wireless communication apparatus 600 according to an embodiment of the present disclosure. As shown in FIG. 9, the apparatus 600 includes:

a receiving unit 630, configured to enable a user equipment in a communication system to receive first indication information used for indicating that the user equipment accesses a first target service via a second access end device and sent by a processing center, wherein the user equipment accesses a target service via a first access end device in at least two access end devices, the first indication information is sent by the processing center when the processing center determines that the user equipment is capable of accessing the first target service via the second access end device in the at least two access end devices according to coverages of the at least two access end devices and a location of the user equipment, communication technologies of the at least two access end devices are different, or carrier frequencies used by the at least two access end devices are different;

a processing unit 610, configured to access the first target service via the second access end device according to the first indication information.

Optionally, the apparatus 600 further includes:

a sending unit 620, configured to send ninth indication information to the processing center, wherein the ninth indication information is used for indicating the location of the user equipment in the communication system, for enabling the processing center to determine the location of the user equipment in the communication system according to the ninth indication information.

Optionally, the apparatus 600 further includes:

a sending unit 620, configured to send third indication information to the processing center, wherein the third indication information is used for indicating a current communication state of the user equipment, for enabling the processing center to determine that the user equipment is capable of accessing the first target service via the second access end device according to the coverages of the at least two access end devices, the location of the user equipment and the third indication information.

Optionally, the fourth indication information is used for indicating at least one of the following:

a current uplink cache state of the user equipment aiming at the target service, a current reference signal receiving power of the user equipment, a current signal interference noise ratio of the user equipment, a current channel quality of the user equipment, a communication technology the user equipment is capable of supporting and a current remaining battery of the user equipment.

The wireless communication apparatus 600 according to the embodiment of the present disclosure may correspond to the user equipment in the method in the embodiment of the present disclosure, moreover, the units, namely, modules in the wireless communication apparatus 600 and the above-mentioned other operations and/or functions are respectively used for achieving corresponding procedures of the method 200 in FIG. 5, and for concision, they will not be repeated redundantly herein.

According to the wireless communication apparatus in the embodiment of the present disclosure, at least two access end devices access to the internet via the same gateway device, the user equipment accesses the target service via the first access end device in the at least two access end devices, if the user equipment is within the coverage of the second access end device, the processing center may determine that the second access end device may serve the user equipment, thus may instruct the user equipment to access the target service via the second access end device to offload the first access end device, since the at least two access end devices access to the internet via the same gateway device, even if the first access end device is of a UMTS technology and the second access end device is of an LTE technology, the first access end device may be offloaded by the second access end device, so that the offloading effect may be improved.

Figure 10:
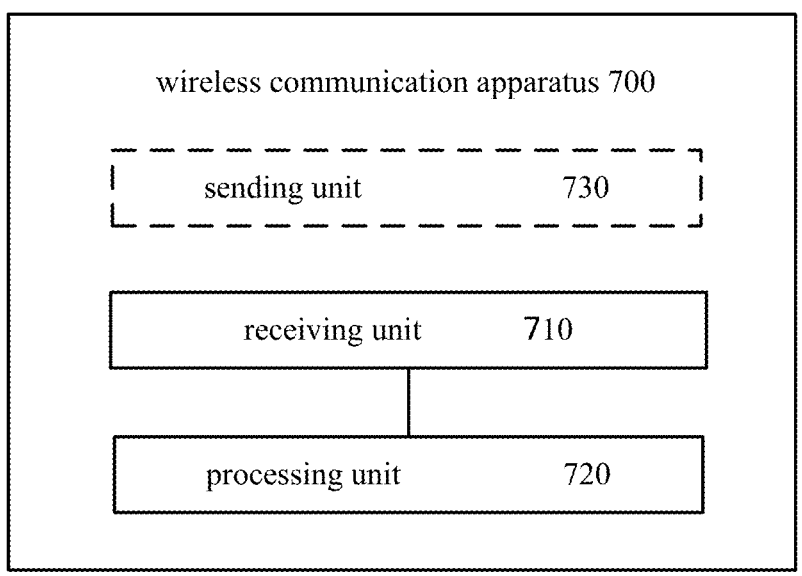
FIG. 10 is a schematic block diagram of a wireless communication apparatus according to another embodiment of the present disclosure.

FIG. 10 shows a schematic block diagram of a wireless communication apparatus 700 according to an embodiment of the present disclosure. As shown in FIG. 10, the apparatus 700 includes:

a sending unit 730, configured to enable a third access end device in a communication system to send tenth indication information to a processing center, wherein the tenth indication information is used for indicating a current communication state of the third access end device, for enabling the processing center to control access of a user equipment to a target service according to a location of the user equipment in the communication system, a coverage of the third access end device or a fourth access end device in the communication system and the tenth indication information, wherein communication technologies of the third access end device and the fourth access end device are different, or carrier frequencies used by the third access end device and the fourth access end device are different.

Optionally, if the user equipment accesses the target service via the third access end device, the tenth indication information is used for indicating at least one of the following: a current downlink cache state of the third access end device aiming at the target service, a current resource allocation of the third access end device aiming at the target service, a current load rate of the third access end device and a current signal interference noise ratio of the user equipment;

If the user equipment accesses the target service via the third access end device, the tenth indication information is used for indicating a current load rate of the third access end device.

Optionally, the user equipment accesses the target service via the fourth access end device, the third access end device accesses to an internet via at least two ports of a first gateway device, and the apparatus 700 further includes:

a receiving unit 710, configured to receive sixth indication information used for indicating a first port and sent by the processing center, wherein the first port is determined by the processing center according to current communication states of the ports of the first gateway device; and a processing unit 720, configured to transmit the first target service via the first port according to the sixth indication information.

Optionally, the user equipment accesses the target service via the fourth access end device, the third access end device is capable of accessing to an internet via any gateway device of at least two second gateway devices, and the apparatus 700 further includes:

a receiving unit 710, configured to receive eighth indication information used for indicating a target second gateway device and sent by the processing center, wherein the target second gateway device is determined by the processing center according to current communication states of the ports of the at least two second gateway devices; and a processing unit 720, configured to transmit the first target service via the target second gateway device according to the eighth indication information.

Optionally, the current communication state of the port includes at least one of the following:

a current link state of the port, and a current load rate of the port.

The wireless communication apparatus 700 according to the embodiment of the present disclosure may correspond to the access end device (the first access end device or the second access end device) in the method in the embodiment of the present disclosure, moreover, the units, namely, modules in the wireless communication apparatus 700 and the above-mentioned other operations and/or functions are respectively used for achieving corresponding procedures of the method 300 in FIG. 6, and for concision, they will not be repeated redundantly herein.

According to the wireless communication apparatus provided by the embodiment of the present disclosure, since the third access end device reports the current communication state of the third access end device to the processing center, offloading may be performed dynamically and intelligently in real time. The problem of mobile network traffic storm is effectively solved and the user experience is effectively improved.

Figure 11:
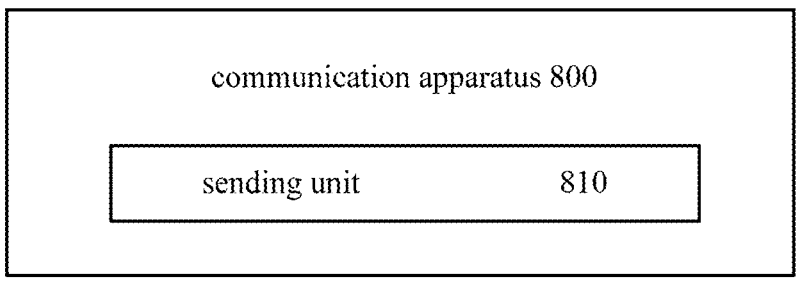
FIG. 11 is a schematic block diagram of a wireless communication apparatus according to another embodiment of the present disclosure.

FIG. 11 shows a schematic block diagram of a wireless communication apparatus 800 according to an embodiment of the present disclosure. As shown in FIG. 11, the apparatus 800 includes:

a sending unit 810, configured to enable a gateway device in a communication system to send eleventh indication information to a processing center, wherein the eleventh indication information is used for indicating a current communication state of a port of the gateway device, for enabling the processing center to determine that a user equipment is capable of accessing a first target service via a second access end device by means of the gateway device, according to a location of the user equipment, which accesses a target service via a first access end device in at least two access end devices included in the communication system, in the communication system, a coverage of the second access end device in the at least two access end devices, a port capacity of the gateway device and the eleventh indication information, wherein the second access end device accesses to an internet via the gateway device, communication technologies of the at least two access end devices are different, or carrier frequencies used by the at least two access end devices are different.

Optionally, the tenth indication information is used for indicating at least one of the following:

a current link state of the port of the gateway device, and a current load rate of the port of the gateway device.

The wireless communication apparatus 800 according to the embodiment of the present disclosure may correspond to the gateway device (the first gateway device or the second gateway device) in the method in the embodiment of the present disclosure, moreover, the units, namely, modules in the wireless communication apparatus 800 and the above-mentioned other operations and/or functions are respectively used for achieving corresponding procedures of the method 400 in FIG. 7, and for concision, they will not be repeated redundantly herein.

According to the wireless communication method provided by the embodiment of the present disclosure, since the gateway device reports the current communication state of the gateway device to the processing center, offloading may be performed dynamically and intelligently in real time. The user experience is effectively improved.

The wireless communication method and apparatus according to the embodiment of the present disclosure have been described above in detail in combination with FIG. 1 to FIG. 11, and a wireless communication system according to the embodiment of the present disclosure will be described below in detail in combination with FIG. 12.

Figure 12:
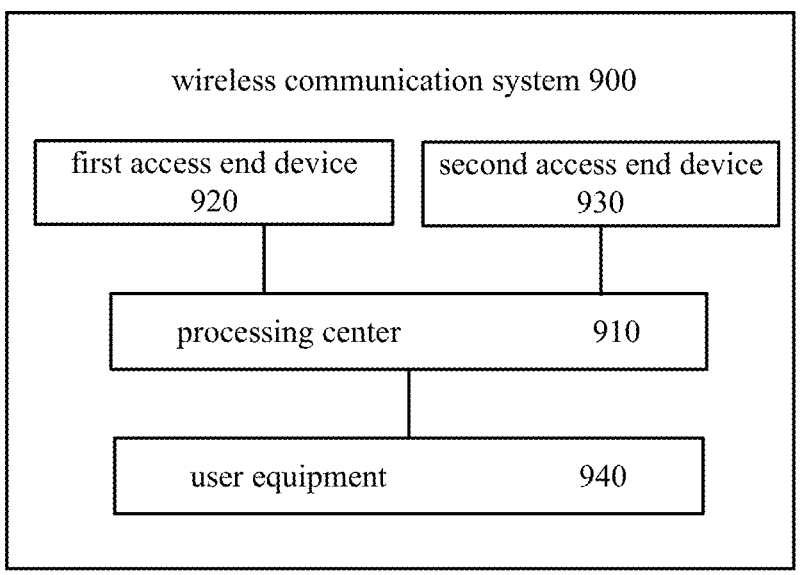
FIG. 12 is a schematic block diagram of a wireless communication system according to another embodiment of the present disclosure.

FIG. 12 shows a schematic block diagram of a wireless communication system 900 according to an embodiment of the present disclosure, as shown in FIG. 12, the system 900 includes:

at least two access end devices, wherein a user equipment accesses a target service via a first access end device 920 in the at least two access end devices, a communication technology of the first access end device 920 is different from a communication technology of a second access end device 930, or a carrier frequency used by the first access end device 920 is different from a carrier frequency used by the second access end device 930;

a processing center 910, configured to determine coverages of the at least two access end devices, determine a location of the user equipment 940 in the communication system, determine that the user equipment is capable of accessing a first target service via the second access end device 930 according to the location of the user equipment 940 in the communication system and a coverage of the second access end device 930 in the at least two access end devices, and send first indication information used for indicating that the user equipment 940 accesses the first target service via the second access end device 930 to the user equipment 940; and the user equipment 940, configured to receive the first indication information sent by the processing center 910, and access the first target service via the second access end device 930 according to the first indication information.

The processing center 910 according to the embodiment of the present disclosure may correspond to the processing center in the method in the embodiment of the present disclosure, moreover, the units, namely, modules in the processing center 910 and the above-mentioned other operations and/or functions are respectively used for achieving corresponding procedures of the method 100 in FIG. 1, and for concision, they will not be repeated redundantly herein.

The user equipment 940 according to the embodiment of the present disclosure may correspond to the user equipment in the method in the embodiment of the present disclosure, moreover, the units, namely, modules in the user equipment 940 and the above-mentioned other operations and/or functions are respectively used for achieving corresponding procedures of the method 200 in FIG. 5, and for concision, they will not be repeated redundantly herein.

The first access end device 920 according to the embodiment of the present disclosure may correspond to the first access end device in the method in the embodiment of the present disclosure and the third access end device in condition 1, moreover, the units, namely, modules in the first access end device 920 and the above-mentioned other operations and/or functions are respectively used for achieving corresponding procedures of the method 300 in FIG. 6, and for concision, they will not be repeated redundantly herein.

The second access end device 930 according to the embodiment of the present disclosure may correspond to the second access end device in the method in the embodiment of the present disclosure and the third access end device in condition 2, moreover, the units, namely, modules in the second access end device 920 and the above-mentioned other operations and/or functions are respectively used for achieving corresponding procedures of the method 300 in FIG. 6, and for concision, they will not be repeated redundantly herein.

It should be understood that, in an embodiment of the present disclosure, the communication system 900 may further include other network elements, for example, a gateway device, a charging device and the like. Moreover, when the second access end device 920 accesses to the internet via a plurality of ports of a certain gateway device (the first gateway device), or when the second access end device 920 accesses to the internet via a plurality of ports of a plurality of gateway devices (the second gateway devices), the gateway device may report the communication state thereof to the processing center, and the process has been illustrated in detail in the method 100.

Moreover, in the embodiment of the present disclosure, there may be one or a plurality of (more than two) first access end devices, this is not particularly limited in the present disclosure, moreover, there may be one or a plurality of (more than two) second access end devices, and this is not particularly limited in the present disclosure It should be understood that, in this paper, the term "and/or" merely describes an association relationship of associated objects and expresses that three relationships may exist. For example, A and/or B may express three conditions that A singly exists, A and B simultaneously exist and B singly exists. In addition, in this paper, the character "/" generally expresses an "or" relationship of front and back associated objects.

It should be understood that, in various embodiments of the present disclosure, the size of the serial numbers of the above-mentioned processes does not mean the execution order, the execution order of the processes should be determined by the functions and internal logics thereof, and should not constitute any limit to the implementation processes of the embodiments of the present disclosure.

Those of ordinary skill in the art may be aware that, units and algorithm steps of the examples described in the embodiments disclosed in this paper may be implemented by electronic hardware, computer software, or a combination of the computer software and the electronic hardware. Whether these functions are implemented in the form of hardware or software is determined by specific applications and design constraint conditions of the technical solutions. Those skilled may implement the described functions by using different methods for each specific application, but this implementation should not be considered as beyond the scope of the present disclosure.

Those skilled in the art to which the present disclosure pertains may clearly understand that, for convenience and simplicity of description, the specific working processes of the system, apparatus and units described above may refer to corresponding processes in the foregoing method embodiments, and will not be repeated redundantly herein.

In the several embodiments provided in the application, it should be understood that, the disclosed system, apparatus and method may be implemented in other manners. For example, the apparatus embodiments described above are merely exemplary, e.g., the division of the units is only a logic function division, other division manners may exist in practical implementation, for example, a plurality of units or components may be combined or integrated to another system, or some features may be omitted or not implemented. In addition, the displayed or discussed mutual coupling or direct coupling or communication connection may be indirect coupling or communication connection of devices or units through some interfaces, and may be in electrical, mechanical or other forms.

The units described as separate components may be separated physically or not, components displayed as units may be physical units or not, namely, may be located in one place, or may be distributed on a plurality of network units. A part of or all of the units may be selected to achieve the purposes of the technical solutions in the embodiments of the present disclosure according to actual demands.

In addition, the functional units in the embodiments of the present disclosure may be integrated in a processing unit, or the units singly exist physically, or two or more units are integrated in one unit.

If the integrated unit is implemented in the form of the software functional unit and is sold or used as an independent product, it may be stored in a computer readable storage medium. Based on this understanding, the technical solutions of the present disclosure substantially, or the part contributing to the prior art, or all or a part of the technical solutions may be implemented in the form of a software product, the computer software product is stored in a storage medium, and includes a plurality of instructions enabling a computer device (may be a personnel computer, a server, or a network device, etc.) to execute all or a part of the steps of the methods in the embodiments of the present disclosure. The foregoing storage medium includes a variety of media capable of storing program codes, such as a USB disk, a mobile hard disk, a read-only memory (ROM), a random access memory (RAM), a magnetic disk, an optical disk or the like.

The foregoing descriptions are merely specific embodiments of the present disclosure, rather than limiting the protection scope of the present disclosure. Any skilled one who is familiar with this art could readily think of modifications or substitutions within the disclosed technical scope of the present disclosure, and these modifications or substitutions shall fall within the protection scope of the present disclosure. Accordingly, the protection scope of the claims should prevail over the protection scope of the present disclosure.

What is claimed is:

1. A wireless communication method comprising:
   determining, by a processing center in a communication system, coverages of at least two access end devices comprised in the communication system, wherein the at least two access end devices access an internet via a same gateway device;
   determining a location of a user equipment in the communication system, wherein the user equipment accesses a target service via a first access end device in the at least two access end devices and the same gateway device;
   determining that the user equipment is capable of accessing a first target service via a second access end device and the same gateway device according to the location of the user equipment in the communication system and a coverage of the second access end device in the at least two access end devices, wherein the first target service is a part of the target service, a communication technology of the first access end device is different from a communication technology of the second access end device, or a carrier frequency used by the first access end device is different from a carrier frequency used by the second access end device; and
   sending first indication information, wherein the first indication information is used for indicating that the user equipment accesses the first target service via the second access end device to the user equipment.

2. The method of claim 1, further comprising:
   receiving second indication information sent by the first access end device, wherein the second indication information is used for indicating a current communication state of the first access end device; and
   wherein determining that the user equipment is capable of accessing the first target service via the second access end device according to the location of the user equipment in the communication system and the coverage of the second access end device in the at least two access end devices, comprises:
      determining that the user equipment is capable of accessing the first target service via the second access end device according to the location of the user equipment in the communication system, the coverage of the second access end device in the at least two access end devices and the second indication information.

3. The method of claim 2, wherein the second indication information is used for indicating at least one of the following:
a current downlink cache state of the first access end device aiming at the target service,
a current resource allocation of the first access end device aiming at the target service,
a current load rate of the first access end device, and
a current signal interference noise ratio of the user equipment.

4. The method of claim 1, further comprising:
receiving third indication information sent by the user equipment, wherein the third indication information is used for indicating a current communication state of the user equipment; and
wherein determining that the user equipment is capable of accessing the first target service via the second access end device according to the location of the user equipment in the communication system and the coverage of the second access end device in the at least two access end devices, comprises:
determining that the user equipment is capable of accessing the first target service via the second access end device according to the location of the user equipment in the communication system, the coverage of the second access end device in the at least two access end devices and the third indication information.

5. The method of claim 4, wherein the third indication information is used for indicating at least one of the following:
a current uplink cache state of the user equipment aiming at the target service,
a current reference signal receiving power of the user equipment,
a current signal interference noise ratio of the user equipment,
a current channel quality of the user equipment,
a communication technology the user equipment is capable of supporting, and
a current remaining battery of the user equipment.

6. The method of claim 1, further comprising:
receiving fourth indication information sent by the second access end device, wherein the fourth indication information is used for indicating a current communication state of the second access end device; and
wherein determining that the user equipment is capable of accessing the first target service via the second access end device according to the location of the user equipment in the communication system and the coverage of the second access end device in the at least two access end devices, comprises:
determining that the user equipment is capable of accessing the first target service via the second access end device according to the location of the user equipment in the communication system, the coverage of the second access end device in the at least two access end devices and the fourth indication information.

7. The method of claim 6, wherein the fourth indication information is used for indicating at least one of the following:
a current resource allocation of the second access end device, and
a current load rate of the second access end device.

8. The method of claim 1, wherein the second access end device is capable of accessing to an internet via any port of at least two ports of a first gateway device, and the method further comprises:
determining communication capacities of the at least two ports;
receiving fifth indication information sent by the first gateway device, wherein the fifth indication information is used for indicating current communication states of the at least two ports;
determining a first port from the at least two ports according to the communication capacities of the at least two ports and the fifth indication information; and
sending sixth indication information for enabling the second access end device to transmit the first target service via the first port, wherein the sixth indication information is used for indicating the first port to the second access end device.

9. The method of claim 8, wherein the fifth indication information is used for indicating at least one of the following:
current link states of the at least two ports, and
current load rates of the at least two ports.

10. The method of claim 1, wherein the second access end device is capable of accessing to an internet via any gateway device of at least two second gateway devices, and the method further comprises:
determining communication capacities of ports of the at least two second gateway devices;
receiving seventh indication information sent by the at least two second gateway devices, wherein the seventh indication information is used for indicating current communication states of the ports of the at least two second gateway devices;
determining a target second gateway device from the at least two second gateway devices according to the communication capacities of the ports of the at least two second gateway devices and the seventh indication information; and
sending eighth indication information for enabling the second access end device to transmit the first target service via the target second gateway device, wherein the eighth indication information is used for indicating the target second gateway device to the second access end device.

11. The method of claim 10, wherein the seventh indication information is used for indicating at least one of the following:
a current link state of the port of the second gateway device, and
a current load rate of the port of the second gateway device.

12. A wireless communication method comprising:
receiving, by a user equipment in a communication system and sent by a processing center, first indication information, wherein:
a) the first indication information is used for indicating that the user equipment accesses a first target service via a second access end device,
b) the user equipment accesses a target service via a first access end device in at least two access end devices and a gateway device, the first target service is a part of the target service, the at least two access end devices access an internet via the gateway device, c) the first indication information is sent by the processing center when the processing center determines that the user equipment is capable of accessing the first target service via the second access end device in the at least two access end devices and the gateway device according to coverages of the at least two access end devices and a location of the user equipment, and d) communication technologies of the at least two access end devices are different, or carrier frequencies used by the at least two access end devices are different; and accessing the first target service via the second access end device according to the first indication information.

13. The method of claim 12, further comprising:
sending ninth indication information to the processing center for enabling the processing center to determine the location of the user equipment in the communication system according to the ninth indication information, wherein the ninth indication information is used for indicating the location of the user equipment in the communication system.

14. The method of claim 12, further comprising:
sending third indication information to the processing center for enabling the processing center to determine that the user equipment is capable of accessing the first target service via the second access end device according to the coverages of the at least two access end devices, the location of the user equipment and the third indication information; and
wherein the third indication information is used for indicating a current communication state of the user equipment.

15. The method of claim 14, wherein the third indication information is used for indicating at least one of the following:
a current uplink cache state of the user equipment aiming at the target service,
a current reference signal receiving power of the user equipment,
a current signal interference noise ratio of the user equipment,
a current channel quality of the user equipment,
a communication technology the user equipment is capable of supporting, and
a current remaining battery of the user equipment.

16. A wireless communication apparatus comprising:
a processing unit configured to:
a) enable a processing center in a communication system to determine coverages of at least two access end devices comprised in the communication system, wherein the at least two access end devices access an internet via a same gateway device;
b) determine a location of a user equipment, in the communication system, wherein the user equipment accesses a target service via a first access end device in the at least two access end devices and the same gateway device; and
c) determine that the user equipment is capable of accessing a first target service via a second access end device and the same gateway device according to the location of the user equipment in the communication system and a coverage of the second access end device in the at least two access end devices, wherein the first target service is a part of the target service, a communication technology of the first access end device is different from a communication technology of the second access end device, or a carrier frequency used by the first access end device is different from a carrier frequency used by the second access end device; and a sending unit configured to send first indication information, wherein the first indication information is used for indicating that the user equipment accesses the first target service via the second access end device to the user equipment.

17. The apparatus of claim 16, further comprising:
a receiving unit configured to receive second indication information sent by the first access end device, wherein the second indication information is used for indicating a current communication state of the first access end device; and
wherein the processing unit is further configured to determine that the user equipment is capable of accessing the first target service via the second access end device according to the location of the user equipment in the communication system, the coverage of the second access end device in the at least two access end devices and the second indication information.

18. The apparatus of claim 17, wherein the second indication information is used for indicating at least one of the following:
a current downlink cache state of the first access end device aiming at the target service,
a current resource allocation of the first access end device aiming at the target service,
a current load rate of the first access end device, and
a current signal interference noise ratio of the user equipment.

19. The apparatus of claim 16, further comprising:
a receiving unit configured to receive third indication information sent by the user equipment, wherein the third indication information is used for indicating a current communication state of the user equipment; and
wherein the processing unit is further configured to determine that the user equipment is capable of accessing the first target service via the second access end device according to the location of the user equipment in the communication system, the coverage of the second access end device in the at least two access end devices and the third indication information.

20. The apparatus of claim 19, wherein the third indication information is used for indicating at least one of the following:
a current uplink cache state of the user equipment aiming at the target service,
a current reference signal receiving power of the user equipment,
a current signal interference noise ratio of the user equipment,
a current channel quality of the user equipment,
a communication technology the user equipment is capable of supporting, and
a current remaining battery of the user equipment.

21. The apparatus of claim 16, further comprising:
a receiving unit configured to receive fourth indication information sent by the second access end device, wherein the fourth indication information is used for indicating a current communication state of the second access end device; and
wherein the processing unit is further configured to determine that the user equipment is capable of accessing the first target service via the second access end device according to the location of the user equipment in the communication system, the coverage of the second access end device in the at least two access end devices and the fourth indication information.

22. The apparatus of claim 21, wherein the fourth indication information is used for indicating at least one of the following:
   a current resource allocation of the second access end device, and
   a current load rate of the second access end device.

23. The apparatus of claim 16, wherein the second access end device is capable of accessing to an internet via a port of at least two ports of a first gateway device, and
   the processing unit is further configured to determine communication capacities of the at least two ports, the apparatus further comprises:
   a) a receiving unit configured to receive fifth indication information sent by the first gateway device, wherein the fifth indication information is used for indicating current communication states of the at least two ports;
   b) the processing unit is further configured to determine a first port from the at least two ports according to the communication capacities of the at least two ports and the fifth indication information; and
   c) the sending unit is further configured to send sixth indication information for enabling the second access end device to transmit the first target service via the first port, wherein the sixth indication information is used for indicating the first port to the second access end device.

24. The apparatus of claim 23, wherein the fifth indication information is used for indicating at least one of the following:
   current link states of the at least two ports, and
   current load rates of the at least two ports.

25. The apparatus of claim 16, wherein the second access end device is capable of accessing to an internet via any gateway device of at least two second gateway devices and the processing unit is further configured to determine communication capacities of ports of the at least two second gateway devices, the apparatus further comprises:
   a receiving unit configured to receive seventh indication information sent by the at least two second gateway devices, wherein the seventh indication information is used for indicating current communication states of the ports of the at least two second gateway devices;
   the processing unit is further configured to determine a target second gateway device from the at least two second gateway devices according to the communication capacities of the ports of the at least two second gateway devices and the seventh indication information; and
   the sending unit is further configured to send eighth indication information for enabling the second access end device to transmit the first target service via the target second gateway device, wherein the eighth indication information is used for indicating the target second gateway device to the second access end device.

26. The apparatus of claim 25, wherein the seventh indication information is used for indicating at least one of the following:
   a current link state of the port of the second gateway device, and a current load rate of the port of the second gateway device.

27. A wireless communication apparatus comprising:
   a receiving unit configured to enable a user equipment in a communication system to receive first indication information sent by a processing center, wherein:
   a) the first indication information is used for indicating that the user equipment accesses a first target service via a second access end device,
   b) the user equipment accesses a target service via a first access end device in at least two access end devices and a gateway device, the first target service is a part of the target service, the at least two access end devices access an internet via the gateway device,
   c) the first indication information is sent by the processing center when the processing center determines that the user equipment is capable of accessing the first target service via the second access end device in the at least two access end devices and the gateway device according to coverages of the at least two access end devices and a location of the user equipment, and
   d) communication technologies of the at least two access end devices are different, or carrier frequencies used by the at least two access end devices are different; and
   a processing unit configured to access the first target service via the second access end device according to the first indication information.

28. The apparatus of claim 27, further comprising:
   a sending unit configured to send ninth indication information to the processing center for enabling the processing center to determine the location of the user equipment in the communication system according to the ninth indication information, wherein the ninth indication information is used for indicating the location of the user equipment in the communication system.

29. The apparatus of claim 27, further comprising:
   a sending unit configured to send third indication information to the processing center for enabling the processing center to determine that the user equipment is capable of accessing the first target service via the second access end device according to the coverages of the at least two access end devices, the location of the user equipment and the third indication information, wherein the third indication information is used for indicating a current communication state of the user equipment.

30. The apparatus of claim 29, wherein the fourth indication information is used for indicating at least one of the following:
   a current uplink cache state of the user equipment aiming at the target service,
   a current reference signal receiving power of the user equipment,
   a current signal interference noise ratio of the user equipment,
   a current channel quality of the user equipment, a communication technology the user equipment is capable of supporting, and
   a current remaining battery of the user equipment.

31. A wireless communication system comprising:
   at least two access end devices, wherein:
   a) the at least two access end devices access an internet via a same gateway device, b) user equipment accesses a target service via a first access end device in the at least two access end devices and the same gateway device, and c) a communication technology of the first access end device is different from a communication technology of a second access end device, or a carrier frequency used by the first access end device is different from a carrier frequency used by the second access end device;

a processing center configured to:
 a) determine coverages of the at least two access end devices,
 b) determine a location of the user equipment in the communication system,
 c) determine that the user equipment is capable of accessing a first target service via the second access end device and the same gateway device according to the location of the user equipment in the communication system and a coverage of the second access end device in the at least two access end devices, wherein the first target service is a part of the target service, and
 d) send first indication information, wherein the first indication information is used for indicating that the user equipment accesses the first target service via the second access end device to the user equipment; and the user equipment is configured to receive the first indication information sent by the processing center, and access the first target service via the second access end device according to the first indication information.

32. The wireless communication system of claim 31, wherein the first access end device is configured to send second indication information to the processing center, wherein the second indication information is used for indicating a current communication state of the first access end device; and the processing center is further configured to determine that the user equipment is capable of accessing the first target service via the second access end device according to the location of the user equipment in the communication system, the coverage of the second access end device in the at least two access end devices and the second indication information.

33. The wireless communication system of claim 31, wherein the user equipment is further configured to send third indication information to the processing center, wherein the third indication information is used for indicating a current communication state of the user equipment; and the processing center is further configured to determine that the user equipment is capable of accessing the first target service via the second access end device according to the location of the user equipment in the communication system, the coverage of the second access end device in the at least two access end devices and the third indication information.

34. The wireless communication system of claim 31, wherein the second access end device is configured to send fourth indication information to the processing center, wherein the fourth indication information is used for indicating a current communication state of the second access end device; and the processing center is further configured to determine that the user equipment is capable of accessing the first target service via the second access end device according to the location of the user equipment in the communication system, the coverage of the second access end device in the at least two access end devices and the fourth indication information.

* * * * *

UNITED STATES PATENT AND TRADEMARK OFFICE
CERTIFICATE OF CORRECTION

PATENT NO. : 10,034,212 B2
APPLICATION NO. : 14/742198
DATED : July 24, 2018
INVENTOR(S) : Du et al.

Page 1 of 1

It is certified that error appears in the above-identified patent and that said Letters Patent is hereby corrected as shown below:

On the Title Page

Item (56), References Cited, Foreign Patent Documents, "WO WO 012149954 A1," should read -- WO 012149954 A1 --.

In the Claims

Column 51, Line 1, In Claim 31, "b) user equipment accesses" should read -- b) a user equipment accesses --.

Signed and Sealed this
Ninth Day of October, 2018

Andrei Iancu
*Director of the United States Patent and Trademark Office*